United States Patent
Steeves et al.

(10) Patent No.: US 12,192,190 B2
(45) Date of Patent: *Jan. 7, 2025

(54) UNIVERSAL ACCESS TO DOCUMENT TRANSACTION PLATFORM

(71) Applicant: DocuSign, Inc., San Francisco, CA (US)

(72) Inventors: David Steeves, Bainbridge Island, WA (US); Gregory J. Alger, Renton, WA (US); Joshua D. Wise, Seattle, WA (US); Jayson C. McCleery, Renton, WA (US); Peleg Atar, Ness Ziona (IL); Ezer Farhi, Givatavim (IL); Ryan J. Cox, Oakland, CA (US)

(73) Assignee: Docusign, Inc., San Francisco, CA (US)

(*) Notice: Subject to any disclaimer, the term of this patent is extended or adjusted under 35 U.S.C. 154(b) by 140 days.

This patent is subject to a terminal disclaimer.

(21) Appl. No.: 17/575,347

(22) Filed: Jan. 13, 2022

(65) Prior Publication Data

US 2022/0141211 A1    May 5, 2022

Related U.S. Application Data

(63) Continuation of application No. 17/227,088, filed on Apr. 9, 2021, now Pat. No. 11,962,578, which is a
(Continued)

(51) Int. Cl.
*H04L 9/40* (2022.01)
*G06F 21/60* (2013.01)
(Continued)

(52) U.S. Cl.
CPC ........ *H04L 63/0823* (2013.01); *G06F 21/604* (2013.01); *G06F 21/645* (2013.01);
(Continued)

(58) Field of Classification Search
CPC .............. H04L 63/0823; H04L 63/062; H04L 63/10; H04L 63/12; H04L 63/08; H04L 63/0428;
(Continued)

(56) References Cited

U.S. PATENT DOCUMENTS 5,948,103 A    9/1999   Fukuzaki
6,367,013 B1   4/2002   Bisbee et al.
(Continued)

FOREIGN PATENT DOCUMENTS

| CN | 1254464 A  | * | 5/2000 | ......... G06Q 20/3821 |
| EP | 2350913 B1 | * | 9/2014 | ............. G06F 21/32 |

(Continued)

OTHER PUBLICATIONS

Aleks, Peterson, "6 of the Best Tools for Digital Transaction Management", (Sep. 29, 2015), 11 pgs.
(Continued)

*Primary Examiner* — Andrew J Steinle
*Assistant Examiner* — Ali H. Cheema
(74) *Attorney, Agent, or Firm* — Shumaker & Sieffert, P.A.

(57) ABSTRACT

A system and method are described in which a document transaction management platform coordinates performance of trust actions across a plurality of trust service providers. For example, a method can include operations executing on a connector module in communication with a digital transaction management platform and a trust service provider, such as the following. Receiving, from the digital transaction management platform, a transaction request including a token and a requested trust action. Accessing user information for a recipient involved in the requested trust action using the token. Obtaining, from the digital transaction management platform, transaction data associated with the requested trust action. Coordinating, with the trust service
(Continued)

provider, performance of the trust action on at least a portion of the transaction data. Transmitting, to the digital transaction management platform, a proof received from the trust service provider confirming performance of the trust action.

14 Claims, 14 Drawing Sheets

Related U.S. Application Data continuation of application No. 16/546,716, filed on Aug. 21, 2019, now Pat. No. 11,005,835, which is a continuation of application No. 15/216,203, filed on Jul. 21, 2016, now Pat. No. 10,419,420, which is a continuation of application No. 15/172,683, filed on Jun. 3, 2016, now Pat. No. 10,291,604.

(51) Int. Cl.
*G06F 21/64* (2013.01)
*G06Q 20/36* (2012.01)
*H04L 9/00* (2022.01)
*H04L 9/32* (2006.01)
*G06F 21/31* (2013.01)
*G06F 21/33* (2013.01)
*G06Q 50/26* (2012.01)

(52) U.S. Cl.
CPC ........... *G06Q 20/367* (2013.01); *H04L 9/006* (2013.01); *H04L 9/3242* (2013.01); *H04L 9/3247* (2013.01); *H04L 63/062* (2013.01); *H04L 63/10* (2013.01); *G06F 21/31* (2013.01); *G06F 21/33* (2013.01); *G06F 21/64* (2013.01); *G06Q 20/3674* (2013.01); *G06Q 50/26* (2013.01); *H04L 63/0428* (2013.01)

(58) Field of Classification Search
CPC ..... H04L 9/006; H04L 9/3242; H04L 9/3247; H04L 9/3236; H04L 9/321; G06F 21/604; G06F 21/645; G06F 21/31; G06F 21/33; G06F 21/64
See application file for complete search history.

(56) References Cited

U.S. PATENT DOCUMENTS

| | | | |
|---|---|---|---|
| 6,553,494 B1 | 4/2003 | Glass | |
| 6,745,327 B1* | 6/2004 | Messing | H04L 9/3263 713/157 |
| 6,796,489 B2 | 9/2004 | Slater et al. | |
| 6,904,416 B2 | 6/2005 | Nassiri | |
| 7,139,910 B1 | 11/2006 | Ainsworth et al. | |
| 7,177,847 B2 | 2/2007 | Atkinson et al. | |
| 7,178,030 B2 | 2/2007 | Scheidt et al. | |
| 7,237,114 B1* | 6/2007 | Rosenberg | G06F 21/6209 713/193 |
| 7,360,079 B2 | 4/2008 | Wall et al. | |
| 7,698,230 B1 | 4/2010 | Brown et al. | |
| 8,104,074 B2* | 1/2012 | Cameron | G06F 21/33 713/170 |
| 8,145,909 B1 | 3/2012 | Agrawal et al. | |
| 8,627,437 B2* | 1/2014 | Dietrich | H04L 63/08 713/168 |
| 8,645,708 B2 | 2/2014 | Labaton | |
| 8,868,916 B2 | 10/2014 | Shapiro | |
| 8,949,708 B2 | 2/2015 | Peterson et al. | |
| 9,665,737 B2 | 5/2017 | Petrogiannis et al. | |
| 9,722,794 B2 | 8/2017 | Blair et al. | |
| 9,736,127 B2 | 8/2017 | Fleischman et al. | |
| 9,866,393 B1 | 1/2018 | Rush et al. | |
| 10,110,385 B1* | 10/2018 | Rush | H04L 9/3234 |
| 10,291,604 B2 | 5/2019 | Steeves et al. | |
| 10,404,679 B2 | 9/2019 | Steeves et al. | |
| 10,419,420 B2 | 9/2019 | Steeves et al. | |
| 10,721,232 B2 | 7/2020 | Peterson et al. | |
| 11,005,835 B2 | 5/2021 | Steeves et al. | |
| 2002/0026583 A1 | 2/2002 | Harrison et al. | |
| 2002/0103851 A1 | 8/2002 | Kikinis et al. | |
| 2003/0078880 A1 | 4/2003 | Alley et al. | |
| 2004/0054890 A1* | 3/2004 | Vasseur | G06Q 50/60 370/428 |
| 2004/0078394 A1* | 4/2004 | Powell | G06F 21/606 |
| 2004/0098606 A1* | 5/2004 | Tan | G06Q 30/02 726/1 |
| 2004/0210527 A1 | 10/2004 | Woda et al. | |
| 2004/0243475 A1* | 12/2004 | Aronsson | G06Q 20/102 705/26.35 |
| 2005/0005111 A1 | 1/2005 | Brebner et al. | |
| 2005/0209955 A1 | 9/2005 | Underwood et al. | |
| 2005/0231738 A1* | 10/2005 | Huff | G06Q 10/10 358/1.1 |
| 2006/0075245 A1 | 4/2006 | Meier | |
| 2007/0165904 A1 | 7/2007 | Nudd et al. | |
| 2007/0198432 A1 | 8/2007 | Pitroda et al. | |
| 2007/0220614 A1 | 9/2007 | Ellis et al. | |
| 2007/0245403 A1 | 10/2007 | Ginter et al. | |
| 2008/0077799 A1 | 3/2008 | Labaton | |
| 2008/0097777 A1 | 4/2008 | Rielo et al. | |
| 2008/0263102 A1 | 10/2008 | Mochizuki | |
| 2009/0003588 A1 | 1/2009 | Ross | |
| 2009/0006842 A1 | 1/2009 | Ross et al. | |
| 2009/0178130 A1* | 7/2009 | Botz | G06F 21/335 726/10 |
| 2009/0265187 A1 | 10/2009 | Boone et al. | |
| 2009/0307029 A1* | 12/2009 | Ramanathan | G06Q 10/00 705/50 |
| 2010/0122081 A1 | 5/2010 | Sato et al. | |
| 2010/0192204 A1 | 7/2010 | Boulos et al. | |
| 2010/0328320 A1 | 12/2010 | Kerstna et al. | |
| 2011/0096174 A1 | 4/2011 | King et al. | |
| 2012/0092374 A1* | 4/2012 | Sarnoff | H04N 1/3871 345/634 |
| 2013/0013529 A1 | 1/2013 | Chheda et al. | |
| 2013/0104251 A1 | 4/2013 | Moore et al. | |
| 2013/0117400 A1 | 5/2013 | An et al. | |
| 2013/0124870 A1* | 5/2013 | Rosati | H04L 9/3297 713/168 |
| 2013/0159521 A1 | 6/2013 | Marocchi et al. | |
| 2013/0311772 A1 | 11/2013 | Etheridge | |
| 2013/0318354 A1* | 11/2013 | Entschew | H04L 9/3247 713/175 |
| 2014/0032914 A1 | 1/2014 | Foygel | |
| 2014/0067670 A1 | 3/2014 | Dheer et al. | |
| 2014/0119540 A1 | 5/2014 | Pearson et al. | |
| 2014/0149735 A1 | 5/2014 | Tenenboym et al. | |
| 2014/0153787 A1 | 6/2014 | Schmidtler et al. | |
| 2014/0164776 A1 | 6/2014 | Hook et al. | |
| 2014/0240740 A1* | 8/2014 | Salgado | G06F 3/1208 358/1.15 |
| 2014/0250163 A1 | 9/2014 | Schneider et al. | |
| 2014/0250491 A1* | 9/2014 | Fleischman | H04L 63/06 726/1 |
| 2014/0278756 A1 | 9/2014 | Saul et al. | |
| 2015/0150141 A1 | 5/2015 | Szymanski et al. | |
| 2015/0302398 A1 | 10/2015 | Desai et al. | |
| 2016/0050177 A1* | 2/2016 | Cue | H04L 67/1095 709/206 |
| 2016/0127358 A1* | 5/2016 | Engelking | H04W 12/088 713/156 |
| 2016/0149769 A1 | 5/2016 | Joshi et al. | |
| 2016/0150040 A1 | 5/2016 | Fan et al. | |
| 2016/0182237 A1 | 6/2016 | Almgren | |
| 2016/0189147 A1 | 6/2016 | Vanczak | |
| 2016/0262017 A1 | 9/2016 | Lavee et al. | |
| 2016/0300258 A1 | 10/2016 | Chao et al. | |
| 2017/0033933 A1 | 2/2017 | Haber et al. | |
| 2017/0063553 A1 | 3/2017 | Saxena et al. | |
| 2017/0141926 A1* | 5/2017 | Xu | H04L 63/0209 |
| 2017/0344245 A1* | 11/2017 | Kumar | G06F 21/645 |

(56) References Cited

U.S. PATENT DOCUMENTS

| | | | |
|---|---|---|---|
| 2017/0353314 A1 | 12/2017 | Steeves et al. | |
| 2017/0353445 A1 | 12/2017 | Steeves et al. | |
| 2017/0353457 A1 | 12/2017 | Steeves et al. | |
| 2018/0212782 A1* | 7/2018 | Csik | G06F 21/64 |
| 2020/0169415 A1 | 5/2020 | Schmidt | |
| 2021/0226942 A1 | 7/2021 | Steeves et al. | |

FOREIGN PATENT DOCUMENTS

| | | | |
|---|---|---|---|
| EP | 3252649 A1 | 12/2017 | |
| FR | 2950770 A1 | 4/2011 | |
| JP | 2003504732 A | 2/2003 | |
| JP | 2004128894 A * | 4/2004 | H04L 63/0823 |
| JP | 3871300 B2 | 1/2007 | |
| KR | 20070055231 A | 5/2007 | |
| KR | 20080069879 A | 7/2008 | |
| KR | 20090027555 A * | 3/2009 | G06F 40/10 |
| KR | 10-2010-0053158 A | 5/2010 | |
| KR | 100981757 B1 * | 9/2010 | G06Q 20/1235 |
| KR | 20150006909 A * | 1/2015 | G06Q 30/02 |
| KR | 20150077446 A | 7/2015 | |
| KR | 101559608 B1 | 10/2015 | |
| KR | 20170029759 A * | 3/2017 | G06F 21/577 |
| RU | 2568057 C2 | 11/2015 | |
| SE | 1350947 A1 | 2/2015 | |
| WO | WO 01/41360 A2 | 6/2001 | |
| WO | 2009101478 A2 | 8/2009 | |
| WO | 2014098745 A1 | 6/2014 | |

OTHER PUBLICATIONS

U.S. Appl. No. 15/216,172, Final Office Action mailed Dec. 10, 2018, 27 pgs.

U.S. Appl. No. 15/216,172, Non Final Office Action mailed May 16, 2018, 30 pgs.

U.S. Appl. No. 15/216,172, Notice of Allowance mailed Apr. 18, 2019, 20 pgs.

U.S. Appl. No. 15/216,172, Response filed Aug. 16, 2018 to Non Final Office Action mailed May 16, 2018, 13 pgs.

U.S. Appl. No. 15/216,203, Response filed Oct. 22, 2018 to Non Final Office Action mailed Jun. 21, 2018, 14 pgs.

U.S. Appl. No. 15/172,683, Corrected Notice of Allowability mailed Mar. 6, 2019, 2 pgs.

U.S. Appl. No. 15/172,683, Notice of Allowance mailed Jan. 28, 2019, 9 pgs.

U.S. Appl. No. 15/172,683, Response filed Oct. 22, 2018 to Non Final Office Action mailed Jun. 15, 2018, 16 pgs.

U.S. Appl. No. 15/216,172, Response filed Mar. 7, 2019 to Final Office Action mailed Dec. 10, 2018, 11 pgs.

European Application Serial No. 17174445.1, Extended European Search Report mailed Nov. 3, 2017, 7 pgs.

European Application Serial No. 17174445.1, Response filed Jun. 6, 2018 to Extended European Search Report mailed Nov. 3, 2017, 82 pgs.

Leece et al., "Electronic Document Image Resizing," Dipartimento di Informatica, Universita degli Studi di Bari, Via Amendola, Bari-Italy, Date added to IEEE_Xplore: Aug. 6, 2002, 4 pages.

United States Office Action, U.S. Appl. No. 15/172,683, filed Jun. 15, 2018, 34 pages.

United States Office Action, U.S. Appl. No. 15/216,203, filed Jan. 31, 2019, 23 pages.

United States Office Action, U.S. Appl. No. 15/216,203, filed Jun. 21, 2018, 23 pages.

United States Office Action, U.S. Appl. No. 16/546,716, filed Nov. 17, 2020, 15 pages.

Bin et al., "Electronic seal system based on RSA algorithm and public-key infrastructure", 2010 International Conference on Networking and Digital Society, IEEE, May 2010, 4 pp.

Goswami et al., "A PKI based timestamped secure signing tool for e-documents", 2014 International Conference on High Performance Computing and Applications (ICHPCA), IEEE, Dec. 2014, 6 pp.

Intent to Grant from counterpart European Application No. 17174445.1 dated Jul. 16, 2018, 142 pp.

Prosecution History from U.S. Appl. No. 15/216,203, dated Jun. 21, 2018 through Jun. 24, 2019, 90 pp.

Prosecution History from U.S. Appl. No. 16/546,716, dated Nov. 17, 2020 through Mar. 19, 2021, 49 pp.

Prosecution History from U.S. Appl. No. 17/227,088, dated Jan. 10, 2023 through May 9, 2023, 82 pp.

Yang et al., "An Electronic Seal System Based on Cloud Computing", 2016 International Conference on Cyber-Enabled Distributed Computing and Knowledge Discovery (CyberC), IEEE, Oct. 2016, 4 pp.

Final Office Action from U.S. Appl. No. 17/227,088 dated Aug. 16, 2023, 21 pp.

Notice of Allowance from U.S. Appl. No. 17/227,088 dated Dec. 4, 2023, 25 pp.

* cited by examiner

UNIVERSAL ACCESS TO DOCUMENT TRANSACTION PLATFORM

PRIORITY

This application is a Continuation of U.S. patent application Ser. No. 17/227,088, filed on Apr. 9, 2021, which is a Continuation of U.S. patent application Ser. No. 16/546,716, filed on Aug. 21, 2019, now U.S. Pat. No. 11,005,835, which is a Continuation of U.S. patent application Ser. No. 15/216,203, filed on Jul. 21, 2016, now U.S. Pat. No. 10,419,420, which is a Continuation of U.S. patent application Ser. No. 15/172,683, filed on Jun. 3, 2016, now U.S. Pat. No. 10,291,604, which applications are incorporated by reference herein their entireties.

TECHNICAL FIELD

Embodiments of the present disclosure relate generally to enabling users of a document transaction platform to select a desired trust service provider and, more particularly, but not by way of limitation, to enabling access to a plurality of trust service providers for providing trust services for transactions managed through a document transaction management (DTM) platform.

BACKGROUND

Delivering application software, such as customer relationship management (CRM) applications or various document management tools, has made a dramatic shift towards being provided as a rentable online service delivered over the Internet. Commonly referred to as Software as a Service (SaaS) or more recently as cloud-based services, businesses and individual users are more and more often simply logging in to a light-weight local application or a web browser that taps into a cloud-based platform to deliver the desired functionality. Even applications as common as word processing are moving towards delivery via a cloud-based platform (or at least leveraging cloud-based storage mechanism to assist with collaboration, storage, or workflow). However, cloud-based platforms cannot provide the same level of security as a completely local (e.g., within an organizations private network) application or service platform. Accordingly, organizations are increasingly concerned about data security and user authentication, among other security risks, with the increased use of cloud-based platforms and services.

For example, if a cloud-based document transaction management system is used, the organization must trust the service provider to provide adequate safeguards and security measures to protect sensitive data stored and manipulated by the provider, not to mention trusting related processes such as electronic or digital signatures. This lack of trust and/or controls can create a significant adoption barrier for new services. Service providers must combat this by articulating how secure their service is and attempting to prove it to customers in a myriad of ways (certifications among others).

BRIEF DESCRIPTION OF THE DRAWINGS

Various ones of the appended drawings merely illustrate example embodiments of the present disclosure and cannot be considered as limiting its scope.

Figure 1:
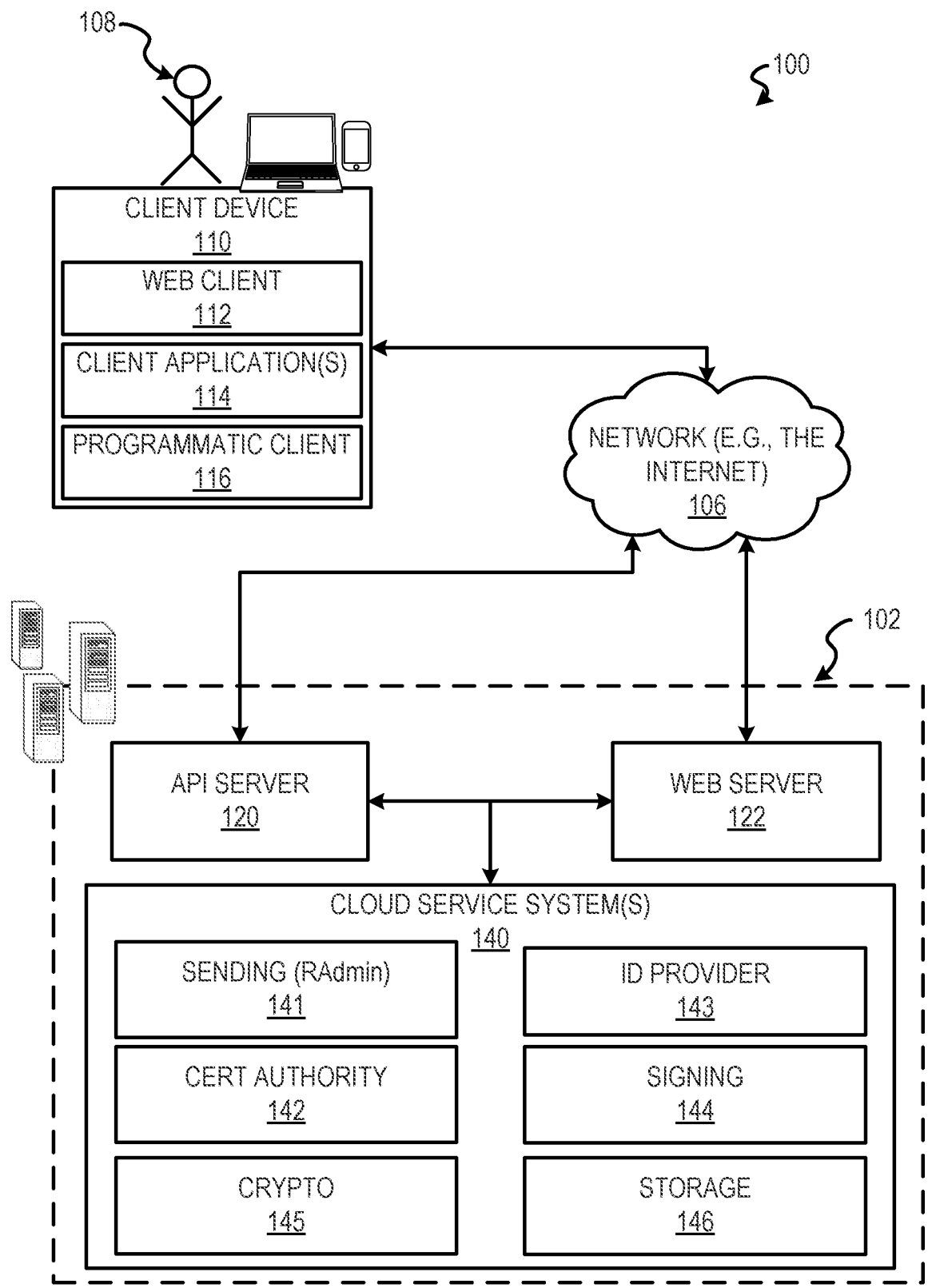
FIG. 1 is a block diagram illustrating a cloud-based platform providing a document transaction management service, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown or discussed in detail.

The systems, methods, techniques, instruction sequences, and computing machine program products discussed herein may utilize and expand upon technologies similar to those described in the following references. Systems and methods for protecting data at rest and cryptographic keys are discussed in U.S. Patent Publication 2014/0250491, titled "SYSTEMS AND METHODS FOR CLOUD DATA SECURITY," which is hereby incorporated by reference in its entirety. Systems and methods for delivering a cloud-based service as discussed in U.S. Provisional Patent Application Ser. No. 62/288,966, titled "CLOUD-BASED COORDINATION OF REMOTE SERVICE APPLIANCES," which is hereby incorporated by reference in its entirety. Systems and techniques for electronic signature process management are discussed in U.S. Pat. No. 8,949,708, titled "WEB-BASED ELECTRONICALLY SIGNED DOCUMENTS," issued on Feb. 3, 2015 to Peterson et al.

The invention discussed herein involves, among other things, providing access to multiple trust service providers (TSPs) within a cloud-base document transaction management (DTM) platform. For the purposes of the following disclosure, a trust service provider (TSP) provides an ability to conduct or perform a trust action associated with data, such as a document, involved in a transaction being managed within the DTM platform. While electronic documents are used as examples throughout this disclosure, a DTM platform can manage transactions with or without associated documents. Trust actions generally result in the TSP being able to provide a proof or evidence of the event having been performed, some verification of who performed it, and what information was provided or presented in conjunction with the action. For example, a TSP may provide a digital signature, electronic signature, authentication or authorization service. The proof provided by the TSP provides evidence that, for example, a digital signature was received from a particular user in reference to a particular electronic document. Alternatively, the proof may provide evidence of the identity of a particular user (e.g., authentication). A proof can take the form of a cryptographically transformed digital hash, which can be analyzed to provide evidence of a particular event or processing of a particular electronic document. As an example, for a digital signature trust action the proof can include a digital hash of the document cryptographically transformed (ie encrypted or decrypted) with a key which has an associated key referenced within a certificate representing a particular user.

The present inventors have recognized, among other things, that a problem to be solved for organizations using cloud-based document transaction management services includes providing these organizations a mechanism to select from a wide variety of TSPs based on parameters associated with each transaction. The inventors have recognized that with the advent of cloud-based DTM platforms, transaction management becomes a global activity, but trust remains uniquely local. Certain localities (e.g., countries) or organizations (e.g., companies or industry segments) have specific rules that must be followed regarding trust related parameters, such as physical location of a TSP. The systems and methods described herein provide a solution by allowing an organization to control, through a policy or similar mechanism, selection of a trust service provider based on rules or parameters. The discussed systems can allow different TSPs for different users and/or different portions of a particular transaction. The present inventors have devised a mechanism for the cloud-based service platform to control and coordinate a document-based transaction including one or more trust actions performed by one or more TSPs. For example, the devised mechanism allows a DTM platform to control a document-based transaction involving two or more recipients (e.g., users) of an electronic document that each need to use a different TSP due to local rules, security concerns, organizational norms, or other factors. Accordingly, the organization can still receive all the benefits of using a cloud-based service provider, while also maintaining control over who, how, and where trust actions are applied to a transaction.

Giving organizations control through the use of one or more TSPs, allows the organization a comfort level not previously possible while leveraging a cloud-based document transaction management service. Previously, DTM platforms provided built-in mechanisms for accomplishing trust actions and generating proofs. While a built-in standard default mechanism may be workable for a certain segment of users, increasingly even individual transactions benefit from the ability to involve multiple trust service providers. The systems and methods discussed herein represent a shift from a DTM applying the proof to a DTM applying any proof, as an example.

With reference to FIG. 1, an example embodiment of high-level client-server-based network architecture 100 is shown that includes details regarding a cloud-based service platform 102 (also referred to as document transaction management (DTM) platform 102) and a client device 110. The DTM platform 102, in the example, forms a network-based service delivery system that provides server-side functionality via a network 106 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Washington State), an application 114, and a programmatic client 116 executing on client device 110.

The client device 110 may comprise, but is not limited to, a mobile phone, desktop computer, laptop, portable digital assistants (PDAs), smart phones, tablets, ultra books, netbooks, laptops, servers, or multi-processor systems, or any other communication device that a user may utilize to access the DTM platform 102. In some embodiments, the client device 110 may comprise a display module (not shown) to display information (e.g., in the form of graphical user interfaces). The client device 110 may be a device of a user that is used to perform a transaction involving digital items within the DTM platform 102, such as documents and related data. One or more users 108 may be a person, a machine, or other means of interacting with client device 110. In some embodiments, the user 108 is not part of the network architecture 100, but may interact with the network architecture 100 via client device 110 or another means. For example, one or more portions of network 106 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. The network architecture 100 may also include a large number of clients accessing various portions of the system via a variety of client devices, client 108 and client device 110 is merely illustrating a representative end-user. Generally, the discussion herein discusses a user or person accessing the DTM platform 102 in terms of user 108, and the device the user or person is using to access the DTM platform 102 as client device 110.

Each client device 110 may include one or more applications (also referred to as "apps") such as, but not limited to, a web browser, messaging application, electronic mail (email) application, a service application (e.g., some form of service specific client-side application used to interact with the cloud-based service platform), and the like. In some embodiments, if the service application is included in a given one of the client devices 110, then this application is configured to locally provide the user interface and at least some of the functionalities with the application configured to communicate with the DTM platform 102, on an as needed basis, for data and/or processing capabilities not locally available. As discussed through out, the service application, such as programmatic client 116, operating on the client device 110, operates in communication and conjunction with aspects of the DTM platform 102 to deliver the cloud-based service to the end-user (e.g., user 108). In some examples, the DTM platform 102 will pass responsibility for at least a portion of the service delivery to user 108 over to a trust service provider (TSP) that can be operating modules or code on the client device 110 or elsewhere on the network. TSPs are then coordinated by the DTM platform 102 to make the service delivery appear seamless to the client device 110, while providing security and other benefits as discussed to the end-user or account owner. In certain examples, the client device 110, via the programmatic client 116, client application 114, or web client 112, may be configured to interact directly with the systems within the customer premise environment or with a third party environment operated by the TSP. These scenarios are discussed further below in reference to FIGS. 2 and 3, among others.

One or more users 108 may be a person, a machine, or other means of interacting with the client device 110. In example embodiments, the user 108 is not part of the network architecture 100, but may interact with the network architecture 100 via the client device 110 or other means. For instance, the user provides input (e.g., touch screen input or alphanumeric input) to the client device 110 and the input is communicated to the DTM platform 102 via the network 106. In this instance, the DTM platform 102, in response to receiving the input from the user, communicates information to the client device 110 via the network 106 to be presented to the user. In this way, the user can interact with the DTM platform 102 using the client device 110. Alternatively, the user may be a recipient of messages or transaction requests from the DTM platform 102 with the client device 110 operating to communicate the requests to the user/recipient and allow the user/recipient to respond, either directly with the DTM platform 102 or by interacting with a TSP.

In an example, an application program interface (API) server 120 and a web server 122 are coupled to, and provide programmatic and web interfaces respectively to, one or more cloud service systems 140. In other example, the API and web interfaces are embedded within the cloud service systems 140 and are not distinguishable as separate servers within the DTM platform. The cloud service systems 140 may host one or more systems, engines, or modules, such as sending/admin module 141, certificate authority module 142, ID provider module 143, signing engine 144, cryptographic module 145, and storage server 146. The different parts of the cloud service systems 140 described here are labeled as a module, server, engine, or system out of convenience to conform to common usage by the inventors or within the industry, the actual implementation of the discussed functionality maybe in hardware, software, or a combination of hardware and software. Modules and engines, in particular, are further defined below in reference to FIGS. 11 and 12.

In this example, the sending/admin module 141 is responsible for communications with users, such as user 108, via a client device, such as client device 110. In some examples, users act primarily as recipients, as often the sending/admin module 141 is sending an electronic communication with an electronic document for the user (e.g., recipient) to approve, sign, or otherwise manipulate in conjunction with a TSP.

In this example, the cloud service system 140 can include a certificate authority module or server 142 (discussed generically as certificate authority 142). Generally, the certificate authority 142 acts as or provides access to a trusted entity that issues electronic credentials that verify a digital entity's identity on a network, such as the Internet. The electronic credentials, often called digital certificates, can be used as part of a public key infrastructure or encryption and decryption.

The ID provider module 143, in this example, provides identity verification and/or authentication services to the cloud service system 140. In an example, the ID provider module 143 can include an LDAP server, Active Directory System, or similar directory service for authenticating users into a system. In certain example, the DTM platform, cloud service system 140, can use external $3^{rd}$ party ID provider.

In this example, the signing engine 144 handles processing tasks involved in managing a document-based transaction, such as document preparation, document presentation, and document signing, among other things. The signing engine 144 can control document workflow to satisfy a transaction request. For example, in a typical real estate transaction an offer to purchase a property could be a transaction handled by the DTM platform 102. Within the real estate transaction the signing engine 144 operates to prepare an uploaded version of the offer document (e.g., purchase agreement) for processing within the DTM platform 102. The preparation processing can include generating different electronic versions of the purchase agreement in different formats, such as an image based (rasterized) version for use in displaying the document or portions of the document for signatures. Other parts of the document transaction workflow may require a PDF version or a particular word processor compatible version. Once the document is prepared for the workflow needed to satisfy the transaction request, the signing engine 144 can work with the sending/admin module 141 to send notifications out to the recipient(s) (e.g., users that need to sign the real estate purchase agreement in this example). It is common for 2 to 4 recipients to be involved in a residential real estate transaction, the signing engine 144 can manage the process of collecting all required signatures. The signing engine 144 can also be involved in presentation of the electronic document for signatures. The signing engine 144 can generate a user-interface (e.g., a signing interface) that displays the document (with or without editable fields), locations to initial, and locations for signatures. The signing interface allows each recipient to electronically initial and/or electronically sign each page of the real estate offer, in this example.

Beyond conducting a signing ceremony as illustrated above, the signing engine 144 can coordinate or perform trust actions that result in a proof associated with the document. In the real estate example, the signing engine 144 can coordinate obtaining digital signatures that provide proof that each recipient was presented the document (purchase agreement) and that the appropriate locations were electronically initialed or electronically signed. In some examples, such as a multi-party real estate transaction, the signing ceremony can be fairly involved and require obtaining signatures in a particular order from a number of recipients. In other examples, the signing engine 144 may coordinate or provide proofs of little more than that the document was presented to a particular recipient or that the document was received on a particular client device.

While the client-server-based network architecture 100 shown in FIG. 1 employs a client-server architecture, the present inventive subject matter is of course not limited to such an architecture, and could equally well find application in a distributed, or peer-to-peer, architecture system, for example.

Figure 2:
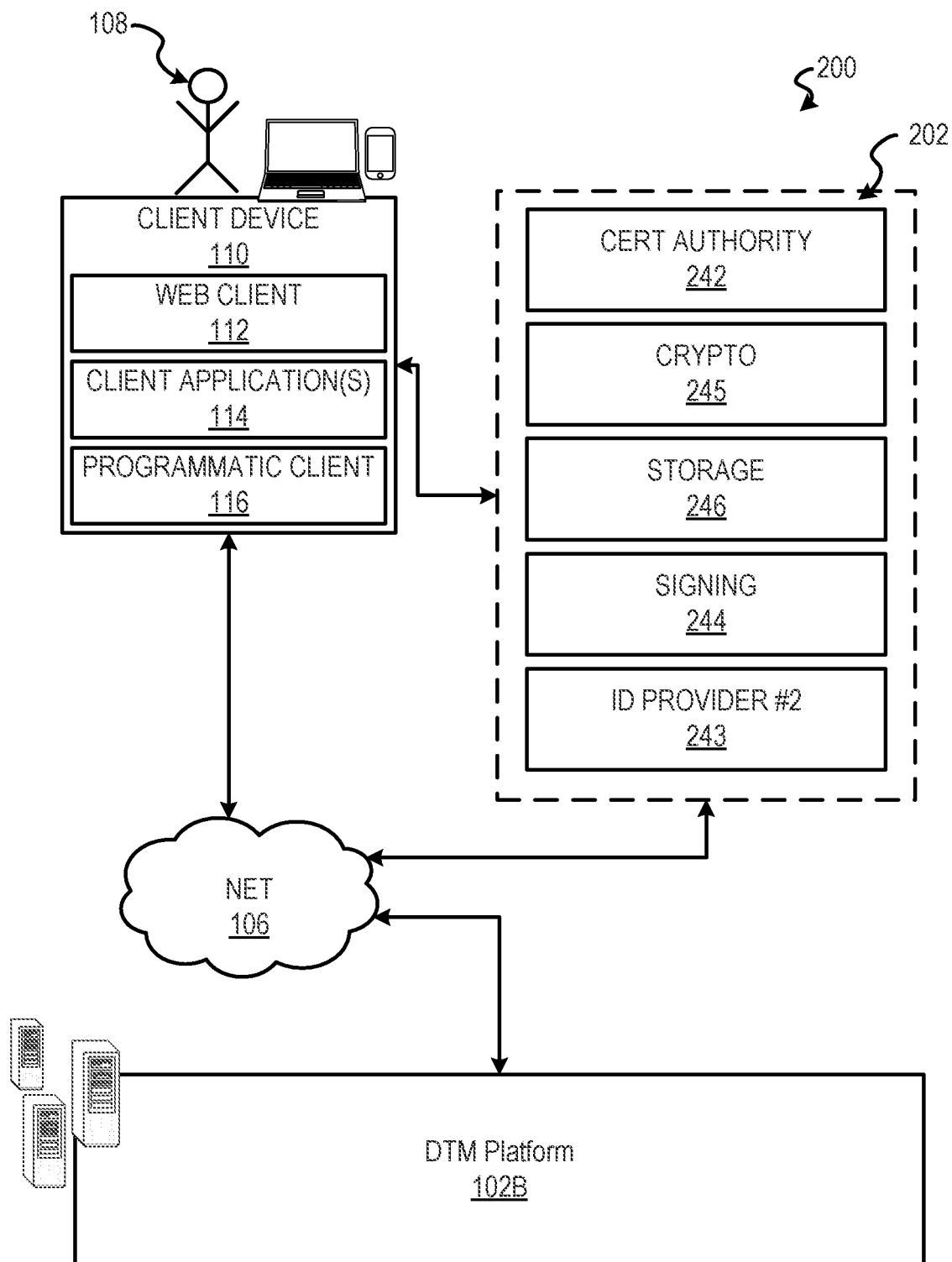
FIG. 2 is a block diagram illustrating a cloud-based platform providing a document transaction management service with certain trust functions provided remotely, according to some example embodiments.

FIG. 2 is a block diagram illustrating a cloud-based platform providing a document transaction management service with certain trust functions provided by a third party trust provider, according to some example embodiments. In this example, network architecture 200 can include systems such as DTM platform 102B, network 106, client device 110, and trust service provider (TSP) 202. As mentioned above, a TSP is an entity (e.g., computer system or module) that provides proof regarding performance of a trust action typically associated with an electronic document that is the focus of a document-based transaction. As illustrated in FIG. 2, a TSP, such as TSP 202, can include many similar systems, modules, or engines as discussed above in reference to cloud service system 140. TSP 202 is illustrated as including a certificate authority module 242, a cryptography module 245, a storage server 246, a signing engine 244, and an ID provider module 243. In certain examples, TSP 202 may optionally include more or fewer modules, servers, or engines as illustrate here. For example, in certain configurations TSP 202 includes a signing engine 244, a certificate authority module 242, and an ID provider 243. As discussed in more detail with regard to FIGS. 5-8, in some examples a TSP, such as TSP 202, includes a connector module for coordinating and communicating with a DTM platform and the client device.

Enabling the DTM platform 102B to work with $3^{rd}$ party TSPs enables end-users, such as account owners, to select different TSPs for different trust related activities managed within the DTM platform 102B. In general, a TSP will provide a proof that includes assertions from the TSP regarding the performed trust action. A trust action can include things like authentication, authorization, digital signatures, or electronic signatures, among other things. TSPs can be operated internal to the DTM platform, such as illustrated and discussed with regard to FIG. 1, external to the DTM platform by a $3^{rd}$ party as illustrated in FIG. 2, or external to the DTM platform by the end-user (also referred to as $2^{nd}$ party). Regardless of the type of TSP, the DTM platform provides information to the TSP on which the TSP will base the proof returned to the DTM platform. In document-based transaction examples, the DTM platform can provide a copy of the electronic document and the TSP can handle presentation and signing. Alternatively, the DTM platform may provide only a hash of the document to the TSP and retain responsibility for presentation of the document, with the TSP providing electronic signing functions. In the later example, the proof returned by the TSP can only assert that the recipient signed (or otherwise operated on) a document represented by the hash provided by the DTM platform. In this example, the TSP cannot provide a proof that guarantees that the user was presented the document allegedly signed, but in certain scenario such a proof may be sufficient.

In an example, the DTM platform 102B can work with TSP 202 to perform trust actions associated with a document-based transaction. Returning to the real estate purchase agreement example discussed above, TSP 202 could be used to provide a proof associated with one or more of the recipient's electronically executing the purchase agreement. The proof provided by TSP 202 could include assertions, by the TSP, that the purchase agreement was presented and signed. Alternatively, the proof provided by the TSP could be more limited, such as only including assertions that a hash of the document presented by the DTM platform was executed by the recipient.

Figure 3:
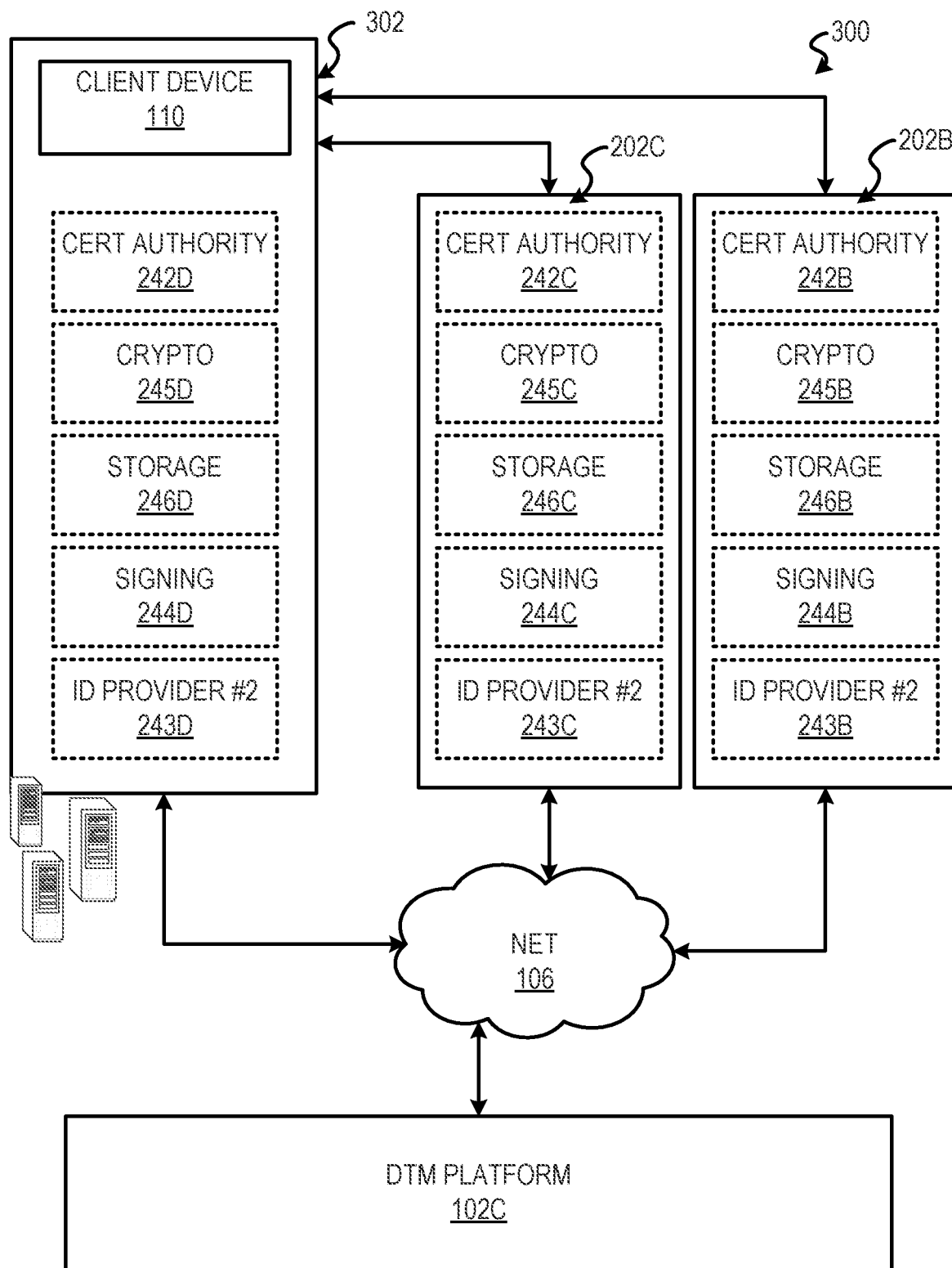
FIG. 3 is a block diagram illustrating a cloud-based platform providing a document transaction management service with certain trust functions provided by a plurality of trust service providers, according to some example embodiments.

FIG. 3 is a block diagram illustrating a cloud-based platform providing a document transaction management service with certain trust functions provided by a plurality of external trust service providers, according to some example embodiments. In this example, network architecture 300 can include systems such as DTM platform 102C, network 106, client system 302, trust service provider (TSP) 202B and trust service provider (TSP) 202C. The DTM platform 102C is similar (or the same as) DTM platform 102B, with the primary difference involving connections to TSP 202B and TSP 202C. TSP 202B, 202C operate similarly to TSP 202, and may be collectively referenced as TSP 202. TSP 202 optionally includes a certificate authority module 242 (242B, 242C), a cryptographic module 245 (245B, 245C), a storage server 246 (246B, 246C), a signing engine 244 (244B, 244C), and an ID provider 243 (243B, 243C). The DTM platform 102C can be configured by an end-user to utilize any combination of TSPs 202 for different transactions, different recipients, different recipient locations, or based on other transaction parameters. Control of how TSPs are selected by the DTM platform can be done through a policy containing rules governing TSP selection.

Figure 4:
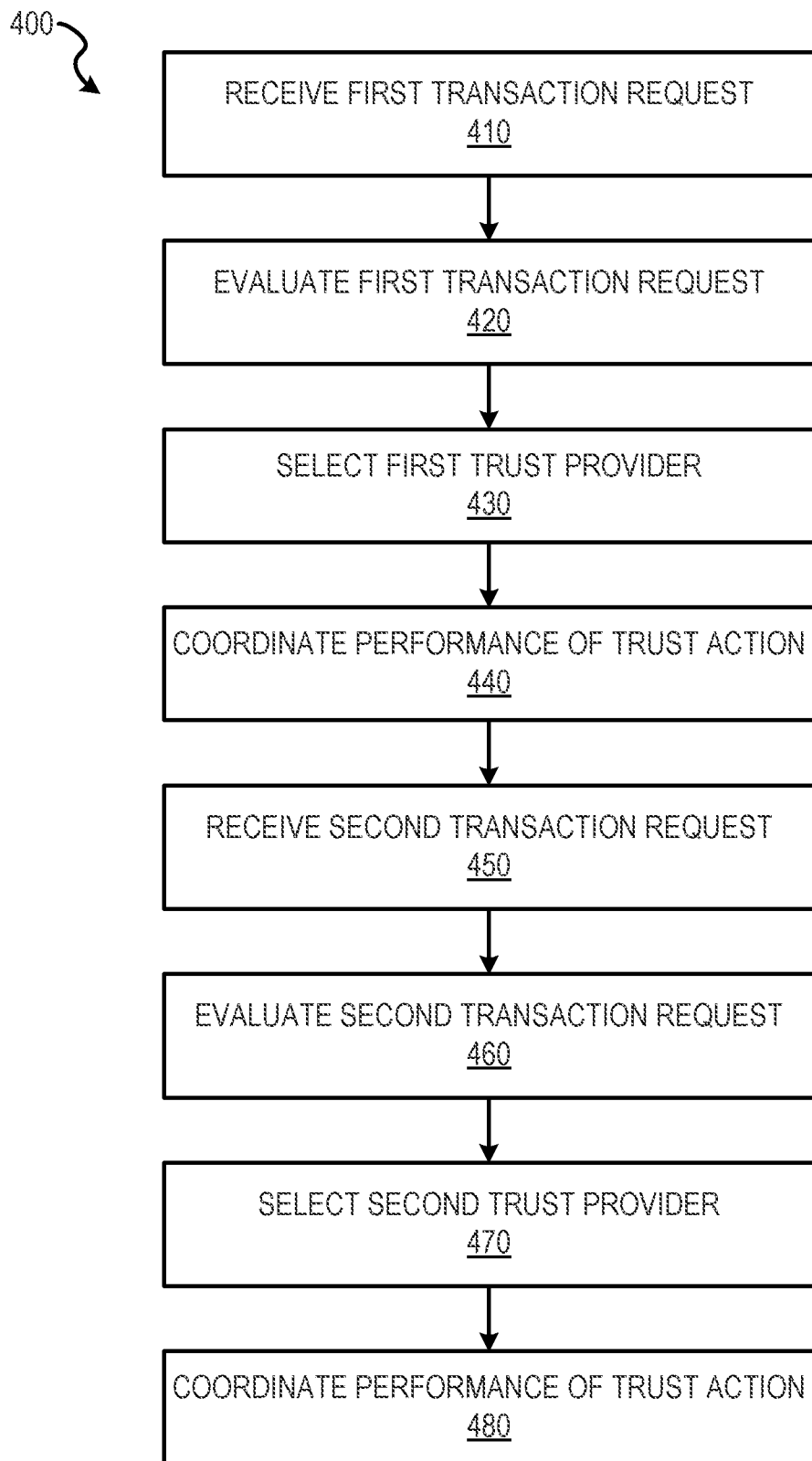
FIG. 4 is a flowchart illustrating a method for coordinating delivery of a document transaction management service with multiple trust service providers, according to some example embodiments.

FIG. 4 is a flowchart illustrating a method 400 for coordinating delivery of a document transaction management service with multiple trust service providers providing trust action proofs, according to some example embodiments. In this example, the method 400 can include operations such as receiving a first transaction request at 410, evaluating the first transaction request at 420, selecting a first trust service provider (TSP) at 430, coordinating performance of the trust action at 440, receiving a second transaction request at 450, evaluating the second transaction request at 460, selecting a second trust service provider (TSP) at 470, and coordinating performance of the trust action at 480. In other examples, the method 400 can include more or fewer operations than illustrated in FIG. 4, and some of the operations may be performed in a different order or concurrently with one another. For example, the receiving the first and second transaction requests could occur concurrently (or asynchronously) with each following operation associated with each transaction request being performed in due course in response to the respective transaction request.

In this example, the method 400 begins at 410 with the DTM platform 102C receiving a first transaction request. The transaction request is, for example, a document-based transaction request including one or more associated electronic documents. The first transaction request includes transaction parameters, such as identification of a trust action to be performed by at least one user. In an example, the trust action involves providing proof that one of the electronic documents is presented to the user and executed by the user.

At 420, the method 400 continues with the DTM platform 102C evaluating the first transaction request. In this example, evaluation of the transaction request involves determining which TSP from a plurality of available TSPs will perform the trust action and return a proof validating completion of the trust action by the user. At 430, the method 400 continues with the DTM platform 102C selecting a first trust provider, such as TSP 202C, based on the evaluation at

420. As noted above, the selection of a TSP can be controlled through evaluation of a policy controlling selection of TSPs. Selection of a TSP can include a default or preferred TSP with alternative or backup TSPs defined within the policy. For example, an end-user can configure a policy to include a preferred TSP for certain transaction types, or certain recipients, among other things. The policy can also include one or more alternative or backup TSPs in case a particular recipient does not have access to the preferred TSP. For example, industry A may commonly provide users (recipients) access to a particular trust provider, such as TSP 202B, and a particular company in industry A may prevent access to another TSP, such as TSP 202C, which might be preferred in a related industry B. Accordingly, in a transaction involving users across industry A and industry B, the preferred TSP may not be accessible to some of the recipients, so an acceptable alternative TSP can be provided for within the DTM platform policy controlling TSP selection. For example, for users from industry B, if the preferred TSP is TSP 202B, then TSP 202C may be an acceptable alternative or backup.

At 440, the method 400 can continue with the DTM platform 102C coordinating performance of a trust action associated with the first transaction request. Coordination of the performance of the trust action can include redirecting the client device 110 to the first trust provider 202B. As will be discussed in further detail below, redirecting can include providing a token for use by the TSP (TSP 202B) in communications back to the DTM platform 102C. Coordination of performance of the trust action can also include receiving a proof returned from the TSP to validate performance of the trust action. The proof returned from the TSP can be verified by the DTM platform to conform with certain pre-defined criteria to ensure the TSP has properly performed the trust action.

At 450, the method 400 continues with the DTM platform 102C receiving a second transaction request. In this example, the second transaction request occurs in sequence or subsequent to completing the first transaction request, but in other examples the second transaction request can be received and operate independently of the first transaction request. In other words, there is no definitive temporal relationship between the first transaction request and the second transaction request, the "first" and "second" indicators are merely labels to identify different transaction requests.

At 460, the method 400 continues with the DTM platform 102C evaluating the second transaction request, such as against a policy with rules for TSP selection. At 470, the method 400 continues with the DTM platform 102C selecting a TSP, such as TSP 202C, based on the evaluation of the second transaction request. The method 400 can conclude at 480 with the DTM platform 102C coordinating performance of the trust action by TSP 202C.

In certain examples, the first and second transaction requests discussed above can involve overlapping electronic documents and/or recipients and still involve selection of different TSPs. As discussed in additional detail below, different TSPs can be selected for each trust action performed in satisfaction of a transaction request.

Figure 5:
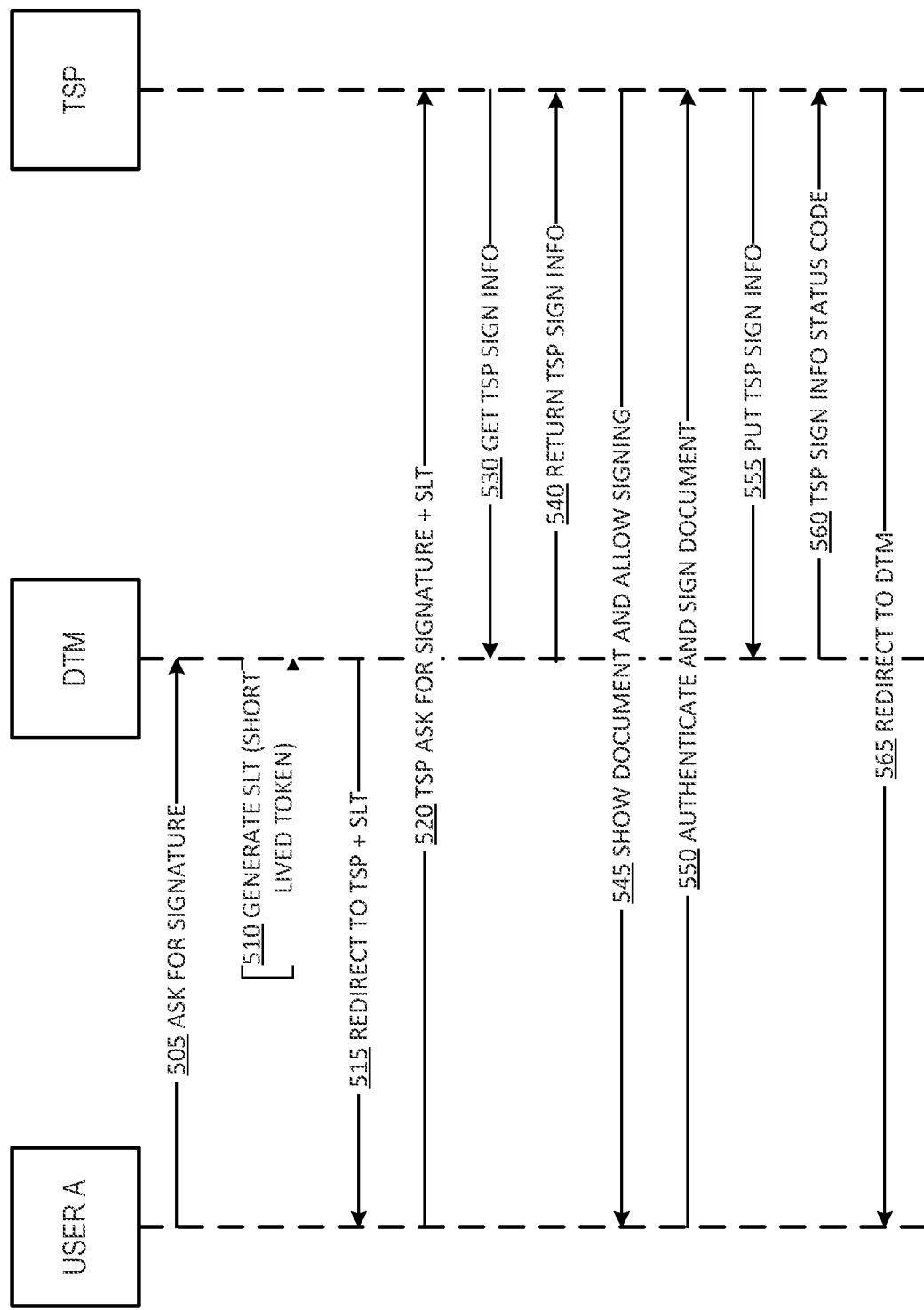
FIG. 5 is a data flow diagram illustrating interactions between various entities delivering a document transaction management service, according to some example embodiments.

FIG. 5 is a data flow diagram illustrating interactions between various entities delivering a document transaction management service utilizing TSPs, according to some example embodiments. In this example, data flows between a user A, a DTM platform (e.g., DTM platform 102C), and a TSP (e.g., TSP 202B) are illustrated according to an example. The data flows begin at 505 with the user A asking DTM platform 102C for a signature (or more generally performance of a trust action returning a proof). The DTM platform 102C responds first by generating internally a short-lived token at 510. The short-lived token is an example mechanism to enable a connector to authenticate with the DTM platform to obtain signing/transaction information. In other examples, other mechanisms can be used to authentication and authorization. Continuing, at 515 the DTM platform 102C sends a redirect to the user A to redirect this portion of the transaction processing to the TSP. In certain examples, the redirect is similar to a web redirect with additional information, such as the short-lived token generated at 510 by the DTM platform 102C. At 520, the user A redirects to the TSP 202B, asking the TSP 202B for a signature and providing TSP 202B with the short-lived token. At 530, TSP 202B uses the short-lived token to get signing information from the DTM platform 102C. In this example, the signing information includes information about the document to be executed. In some example, the document information includes a copy of the electronic document. In other examples, the document information may include only a hash representative of the electronic document. At 540, the DTM platform 102C returns signing information to TSP 202B, which enables TSP 202B to present the document (or a representation of the document) and allow signing at 545 in communication with user A. At 550, the user A authenticates and signs the document in communication with TSP 202B. At 555, TSP 202B returns a proof validating performance of document execution (signing) in this example. At 560, DTM platform 102C sends a proof status code back to TSP 202B to verify receipt of a valid proof in communication 555. Finally, at 565 TSP 202B redirects user A back to DTM platform 102C, which completes full performance of a trust action associated with a document on DTM platform 102C using TSP 202B.

Figure 6:
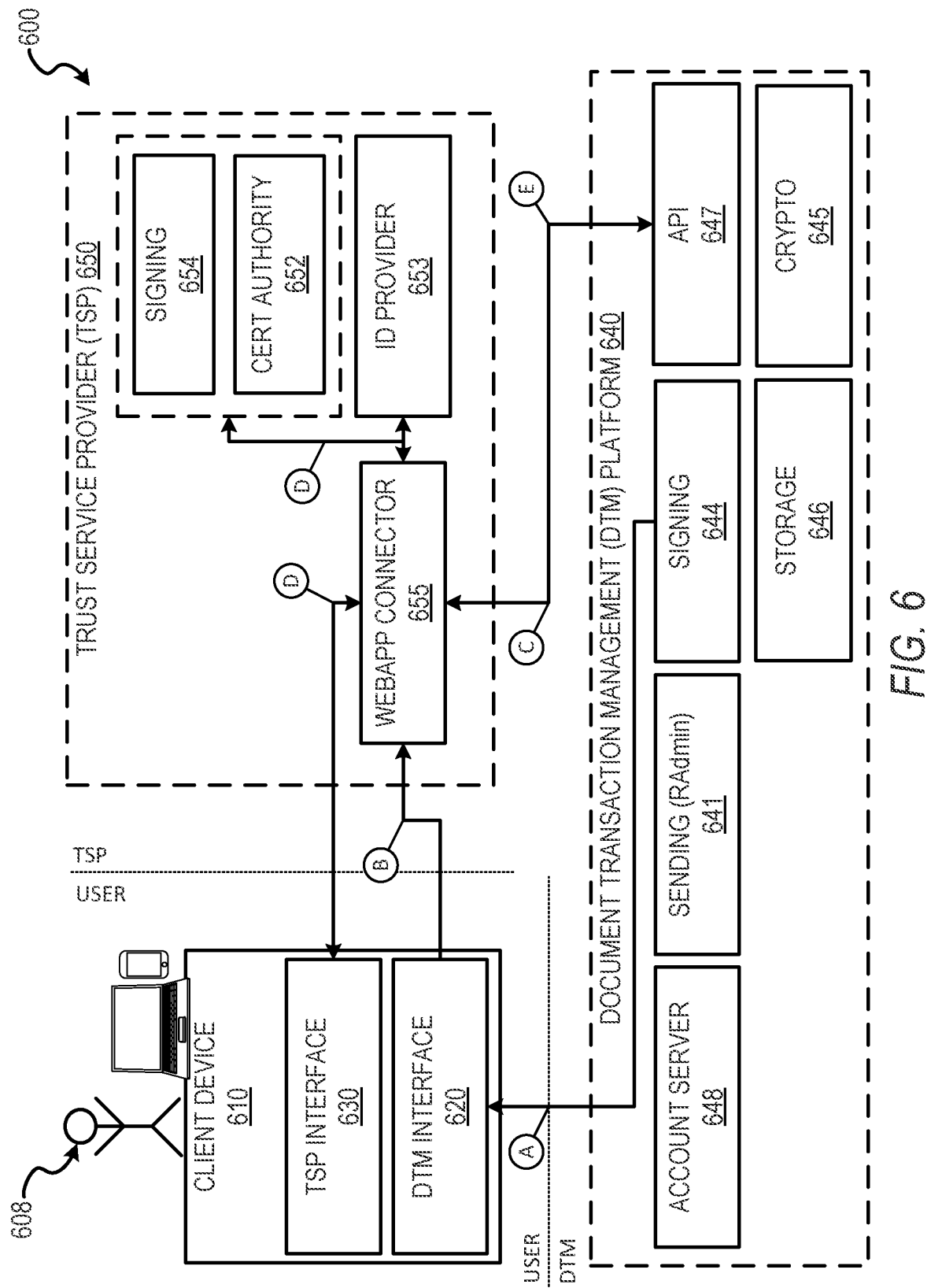
FIG. 6 is a block diagram illustrating interactions between various entities delivering a cloud-based document transaction management service, according to some example embodiments.
Figure 7A:
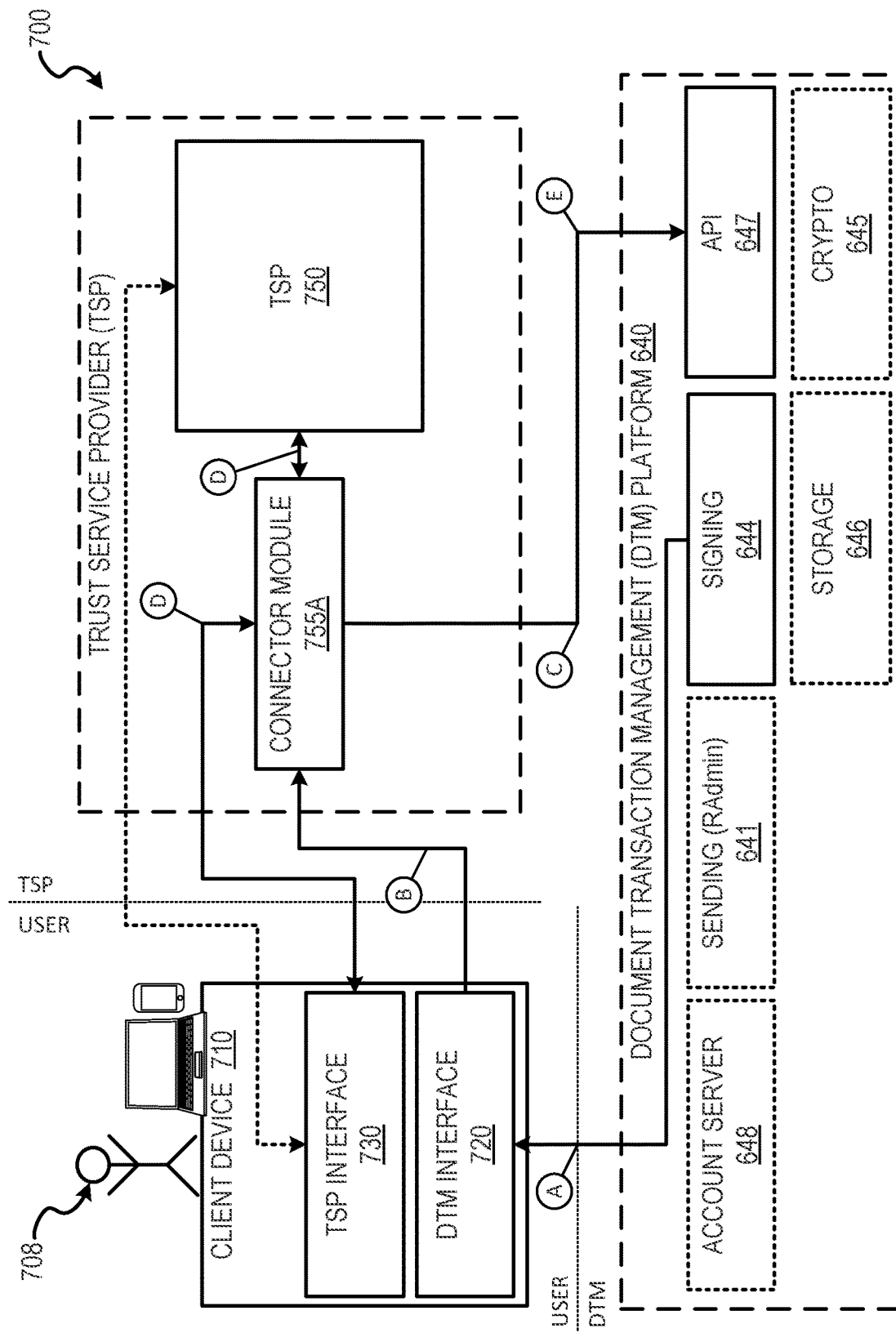
FIGS. 7A-7B are block diagrams illustrating interactions between various entities delivering a cloud-based document transaction management service, according to some example embodiments.
Figure 7B:
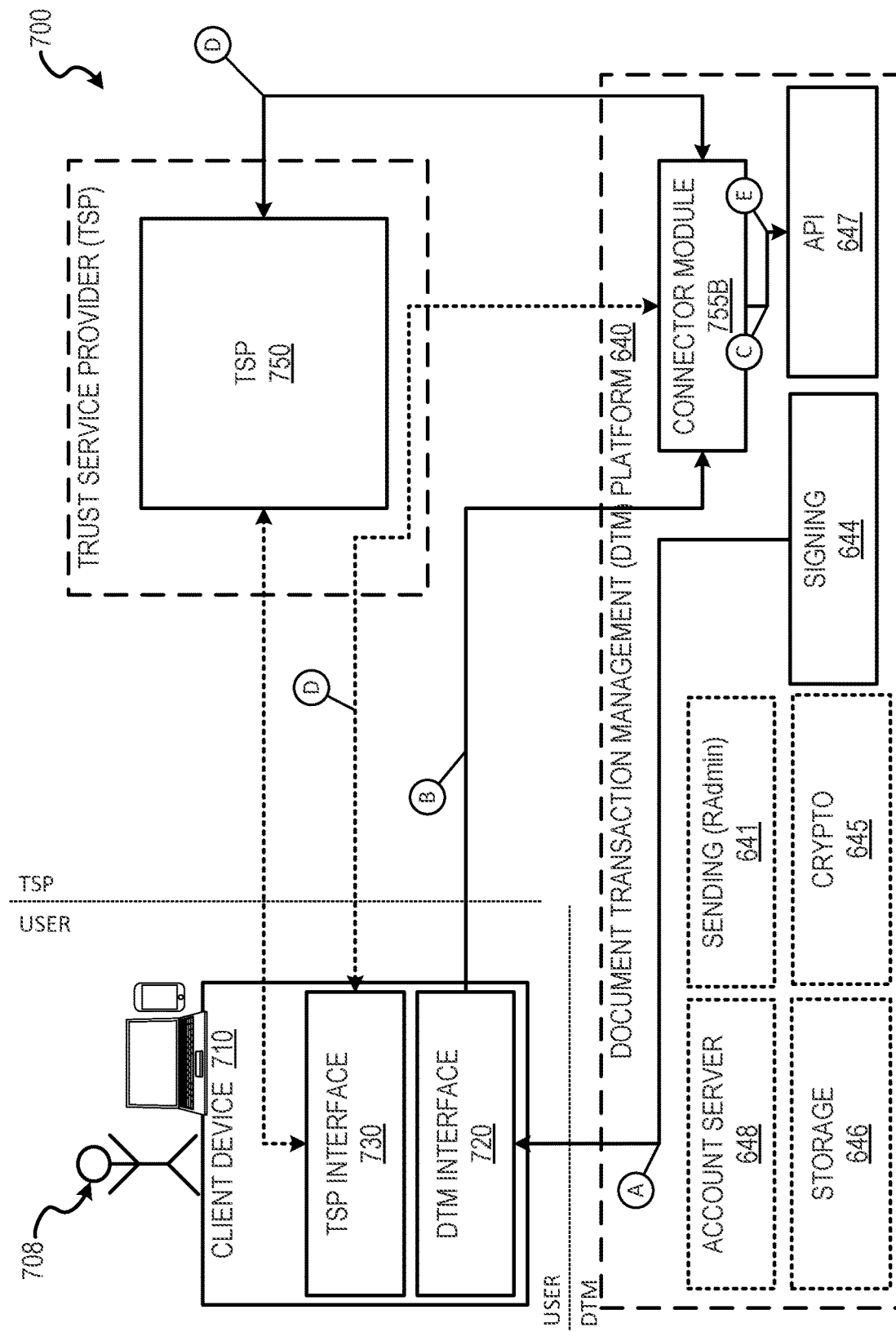
Figure 8:
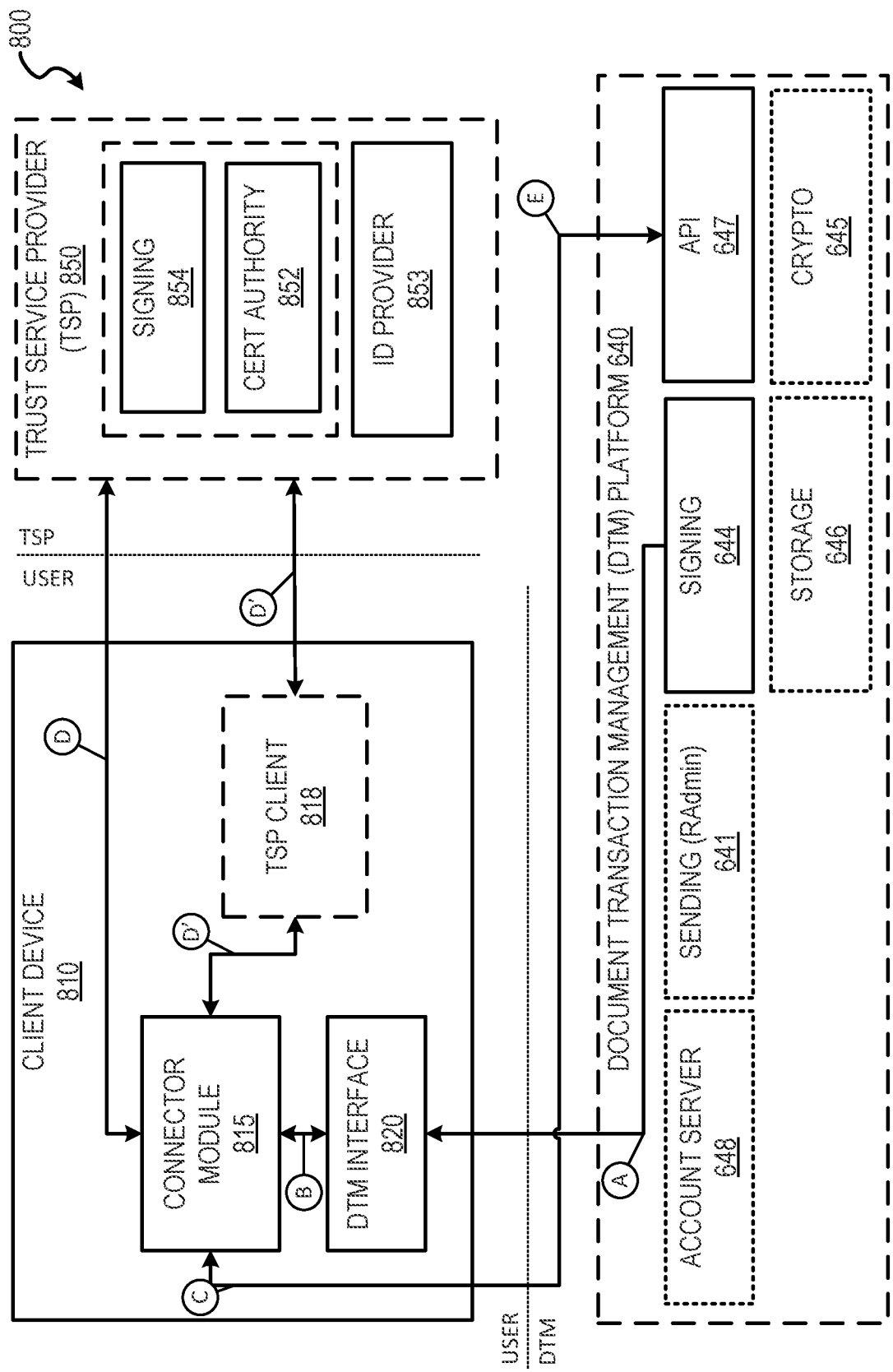
FIG. 8 is a block diagram illustrating interactions between various entities delivering a cloud-based document transaction management service, according to some example embodiments.

FIGS. 6-8 are block diagrams illustrating various distributed systems for delivering cloud-based document transaction management services. The figures each illustrate a different mechanism for connecting trust service providers external to the DTM platform. However, the illustrated and discussed DTM platform can work with all three scenarios concurrently, or any combination of the scenarios. In other words, the DTM platform can connect with TSP and client devices operating in all of the manners illustrated and discussed concurrently. Additionally, each figure includes circled capital letters to label different data flows or state transitions occurring over the illustrated communication paths. The following discussion describes each distributed system and discusses the various data flows or state transitions (referred to as communication(s)) to provide a complete understanding of how the DTM platform interacts with the various TSPs and client device configurations.

FIG. 6 is a block diagram illustrating interactions between various entities delivering a cloud-based document transaction management service, according to some example embodiments. In this example, a distributed system 600 (also referred to as system 600) can include a client device 610, a DTM platform 640, and a TSP 650 communicating to provide a cloud-based document transaction management service. The client device 610 is similar to client device 110 described above, but also includes a DTM interface 620 and a TSP interface 630. The DTM interface 620 can be an application or module executing on the client device 610, which in some examples provides a user-interface displayed via the client device 610 to a user 608. The TSP interface 630 is also an application or module executing on the client device 610, which will also generate a user-interface in some examples. In some examples, the DTM interface 620 and/or the TSP interface 630 is a browser plug-in or applet running within the web browser on the client device 610.

The DTM platform 640 is similar in system configuration and function to the DTM platform 102 discussed above, with additional optional modules or servers, such as account server 648 and API module 647. The DTM platform 640 also includes sending/admin module 641, signing module 644, cryptographic module 645, and storage server 646, which perform functions similar to counterparts discussed above in reference to DTM platform 102.

TSP 650 performs requested trust actions facilitated through connectivity with the client device 610 and the DTM platform 640 via webapp connector 655. TSP 650 is similar to the TSPs discussed above in reference to FIGS. 2 & 3 with the addition of the webapp connector 655 and optionally a signing engine 654, a certificate authority 652, and an ID provider 653. The webapp connector 655 is also referred to as connector 655, as the connector is not necessarily implemented as a webapp or web service. In this example, the webapp connector 655 is running (executing) within an environment controlled by TSP 650 and communicating directly with other systems, modules, and engines operating within the TSP 650 environment.

In an example, the system 600 performs a trust action associated with a document-based transaction starting with communication A. In communication A, the DTM platform 640 sends a request to the DTM interface 620 executing within the client device 610 for the user 608 to perform a trust action on an electronic document associated with the transaction. In some examples, the request sent by the DTM platform 640 can be operated upon automatically by the client device 610 without user 608 being involved (typically based on pre-approvals or other pre-defined parameters set by the user 608). Communication A can include a short-lived token, as discussed in reference to FIG. 5, to enable TSP 650 and/or webapp connector 655 to communicate with DTM platform 640 with reference to the correct transaction and recipient (e.g., user) data. Communication A can also include data representing an electronic document. In some example, the data representing the electronic document will be a copy of the electronic document itself. In other examples, the data representing the electronic document may be a hash of the document, rasterized images of at least a portion of the document, or other representative data. The representative data may be non-editable or only partially editable by the recipient.

Upon receiving the request from the DTM platform 640, the DTM interface 620 generates a user-interface to enable user 608 to initiate the requested trust action (e.g., electronically signing the associated electronic document). In this example, the DTM interface 620 operates as an iframe or browser plug-in and generates the interface within a browser window. In other examples, the DTM interface 620 may generate a stand-alone interface or operate via links in a separate communication, such as an email or similar messaging application. Communication B is generated in response to the user 608 or client device 610 initiating a trust action to be performed by TSP 650. Generally, communication B will forward all of the information included in communication A to the connector 655. However, in some examples communication B can include a more limited set of data. For example, in some examples the DTM interface 620 is responsible for presenting the electronic document to the user 608 via client device 610. In this example, communication B may only include a hash of the electronic document and the TSP 650 would then not be responsible for presenting the document to the user 608. As discussed below, in some examples communication B will not contain any transaction information such as documents or document hashes. In an alternative example, the TSP does not receive any transaction information and the system uses an OAuth token flow. In this example, the TSP receives a short-lived OAuth authorization codes that can, along with the TSP's client secret, be exchanged with the account module/server for an access token, along with optionally an ID token for retrieving additional claims about the user/recipient.

In response to communication B, the webapp connector 655 initiates operations to facilitate performance of the requested trust action by the TSP 650. Facilitating performance of the trust action can begin with communication C between the webapp connector 655 and the DTM platform 640. Communication C includes the short-lived token to enable the DTM platform 640 to locate the transaction and user/recipient identity information. Communication C can return information about the transaction, related documents, and users/recipients involved in the transaction to the webapp connector 655 as necessary to facilitate performance of the trust action. For example, in some scenarios communication A will only contain a short-lived token with no transaction information, so the webapp connector 655 receives transaction, document and identity information directly from the DTM platform 640 in communication C (with communication B only transmitting authorization and/or authentication information). In some examples, the client device 610, via the DTM interface 620, will provide additional identity information for user/recipient 608, which may be further verified or validated by the TSP 650 using ID provider 653. In these examples, document and other similar transaction data is usually obtained by the connector from the API hosted by the DTM platform.

Once the webapp connector 655 obtains the information necessary to for the TSP 650 to perform the requested trust action, communications D occur between the webapp connector 655 and TSP 650. In some examples, a TSP interface 630 is operating on the client device 610 to present information related to the transaction and/or gather information from user 608 related to performance of the trust action. Communications D also involve communication exchanges between webapp connector 655 and various systems, modules, or engines of TSP 650. For example, the TSP signing engine 654 can conduct a signing ceremony in communication with the TSP interface 630. In this example, communications between the TSP 650 and TSP interface 630 occur through the webapp connector 655. In other examples, the TSP 650 can communicate directly with TSP interface 630 on client device 610. Once the TSP 650 has completed the requested trust action, communications D can finish with the TSP 650 sending proof of the performance of the trust action to the webapp connector 655.

Communication E completes the cycle by returning the proof provided by the TSP 650 to the DTM platform 640. In certain examples, in response to receiving the proof provided by the TSP 650 from the webapp connector 655, the DTM platform 640 can validate that the proof provides the needed evidence verifying performance of the trust action by user 608 via the TSP 650. Validation of the proof can be against one or more pre-define criteria that can be used to confirm that the proof meets the minimum requirements as evidence. For example, the DTM platform 640 can verify that the signature corresponds to a certificate that roots to a specific certificate authority. In another example, the DTM platform 640 can verify that the signature corresponds to a certificate containing a specific piece of meta data, such as a name, ID number, or country, among other things. Still other examples, can include the TSP returning a cryptographic message syntax (CMS) blob to be inserted into a PDF file as proof of digital signature. The DTM platform would validate that this data constitutes a valid CMS blob, and could validate the certificate contained therein matches the identity of the signing recipient on the DTM platform.

FIG. 7A is a block diagram illustrating interactions between various entities delivering a cloud-based document transaction management service, according to some example embodiments. In this example, a distributed system 700 can include a client device 710, a DTM platform 640, a TSP 750, and a connector module 755A. Optionally, the connector module 755A is executed within the same environment or system as TSP 750, which is similar to TSPs discussed above. The client device 710 can include DTM interface 720 and TSP interface 730. As discussed above in reference to FIG. 6, both the DTM interface 720 and the TSP interface 730 may optionally include the capability of generating a user-interface to interact with user 708 via client device 710. Connector module 755A operates to translate between the DTM interface 720, the DTM platform 640, and TSP 750. In this example, the connector module 755A also acts as an interface between the TSP interface 730 and TSP 750, in other examples the TSP 750 communicates directly with the TSP interface 730.

In this example, communications begin with communication A from the DTM platform 640 to the DTM interface 720. Similar to communication A discussed in reference to FIG. 6, communication A can include a short-lived token along with other transaction or document related data. In response to communication A, DTM interface 720 can initiate communication B between the client device 710 and connector module 755A within the TSP 750. In this example, communication can be routed through the client device 710 to avoid potential security issues (e.g., firewall access) between the TSP 750 and the DTM platform 640 prior to initiation of a trust action.

Upon receipt of communication B, connector module 755A can initiate communication C with the DTM platform 640 to obtain any additional transaction or document information needed to complete the requested trust action. In response to receiving return communications C, the connector module 755A can begin facilitating performance of the trust action by the TSP 750 through the various communications D. As illustrated, communications D can involve communications between connector module 755A and the TSP 750 as well as communications between connector module 755A and the TSP interface 730. Alternatively, communications D can be limited to communications between the TSP 750 and the connector module 755A, with the TSP 750 communicating directly with the TSP interface 730 operating on the client device 710. FIG. 5 provides additional details regarding example operations and communications that can occur between the connector module 755A and other entities within the system 700.

Communications illustrated in FIG. 7 conclude with the connector module 755A communicating the proof generated by the TSP 750 validating performance of the trust action to the DTM platform 640 via the API module 647. In certain examples, all communications between connector module 755A and DTM interface 720 occur via the API module 747.

FIG. 7B is a block diagram illustrating interactions between various entities delivering a cloud-based document transaction management service, according to some example embodiments. In this example, the distributed system 700 can include a client device 710, a DTM platform 640, a TSP 750, and a connector module 755B that is hosted within DTM platform 640. In this example, communications and operations of the distributed system 700 can operate similarly to those described above in reference to FIG. 7A. However, operating the connector module 755B within the DTM platform 640 offers some opportunities for differences. For example, the connector module 755B can limit communications outside the DTM platform 640 to only the DTM interface 720 and the TSP 750. In other words, the TSP 750 can directly communicate with the TSP interface 730, as necessary. In some examples, the TSP 750 can perform the requested trust action without any direct interaction with the client device 710. This example configuration of the DTM platform 640 and connector module 755B is useful for enabling direct integration of a TSP with the DTM platform 640, which allows for secure communication channels to be established and maintained between the TSP and the DTM platform, among other benefits.

FIG. 8 is a block diagram illustrating interactions between various entities delivering a cloud-based document transaction management service, according to some example embodiments. In this example, a distributed system 800 (also referred to as system 800) can include a client device 810, a DTM platform 640, and a TSP 850 communicating to provide a cloud-based document transaction management service. The client device 810 is similar to client device 110 described above, but also includes a DTM interface 820, connector module 815 and optionally a TSP interface 630. The client device 810, in this example, hosts the connector module 815, which controls communications between the DTM platform 640, DTM interface 820, the client device 810, and the TSP 850. Securing communications between the client device 810 and the TSP 850 is one benefit of the configuration illustrated in FIG. 8. Additionally, users can utilize TSPs that do not want to or are unable to execute modules, engines, servers, or code from the DTM provider, as executing the connector module 815 on the client device allows the connector to be configured to simulate standard client device interactions with the TSP 850. In other words, in some examples, the TSP 850 will not be aware that communications D or D' are being handled by connector module 815. Accordingly, any operating parameters or security protocols setup between the client device 810 and the TSP 850 need not be modified to allow the DTM platform 640 to manage a transaction using the TSP 850 as a trust provider to perform trust actions. Executing the connector module 815 within the client device 810 enables proofs to utility smart cards connected to the client device 810, signing keys stored on the client device 810 or signing keys only accessible by the client device 810. Additionally, the configuration illustrated in FIG. 8 allows TSPs only accessible by the client device 810 to be used, even if the TSPs are not accessible by the DTM platform 640. For example, a TSP may operation within a corporate firewall, or within a protected network that the DTM platform cannot interact with or where the TSP could not communicate outside the protected network.

In an example, the system 800 performs a trust action associated with a document-based transaction starting with communication A. In communication A, the DTM platform 640 sends a request to the DTM interface 820 executing within the client device 810 requesting the user perform a trust action on an electronic document associated with the transaction using a selected TSP, such as the TSP 850. In an alternative example, the communication A can occur directly with the connector module 815 bypassing any user-interface activity that may be supported or provided by DTM interface 820.

In this example, communication B occurs between the DTM interface 820 and the connector module 815 to trigger the connector module 815 to facilitate performance of the trust action with the TSP 850. Communication B can include a short-lived token received from the DTM platform 640 and optionally other user or transaction data that may be needed in performance of the trust action. The illustrated example continues with communication C between the connector module 815 and the DTM platform 640, where the connector module 815 obtains transaction information needed to facilitate performance of the trust action. For example, the connector module 815 can receive a copy of an electronic document to be executed by the user via the TSP 850.

In communication D, the connector module 815 communicates directly with the TSP 850 platform to facilitate performance of the trust action, such as document execution (e.g., via electronic or digital signature). Communication D concludes with the TSP 850 returning a proof as evidence of performance of the trust action. Alternatively, the connector module 815 can communicate (communications D') with the TSP 850 via the TSP client 818.

In another example, TSP 850 is a smartcard connected to the client device 810, such as via USB or similar hardware interface. In this example, the connector module 815 can communicate directly with the smartcard to facilitate performance the trust action provided by the smartcard, such as authentication or digital signatures. The connector module 815 communicates with the smartcard TSP 850 as if it is communicating with TSP client 818 via communication D'.

Figure 9A:
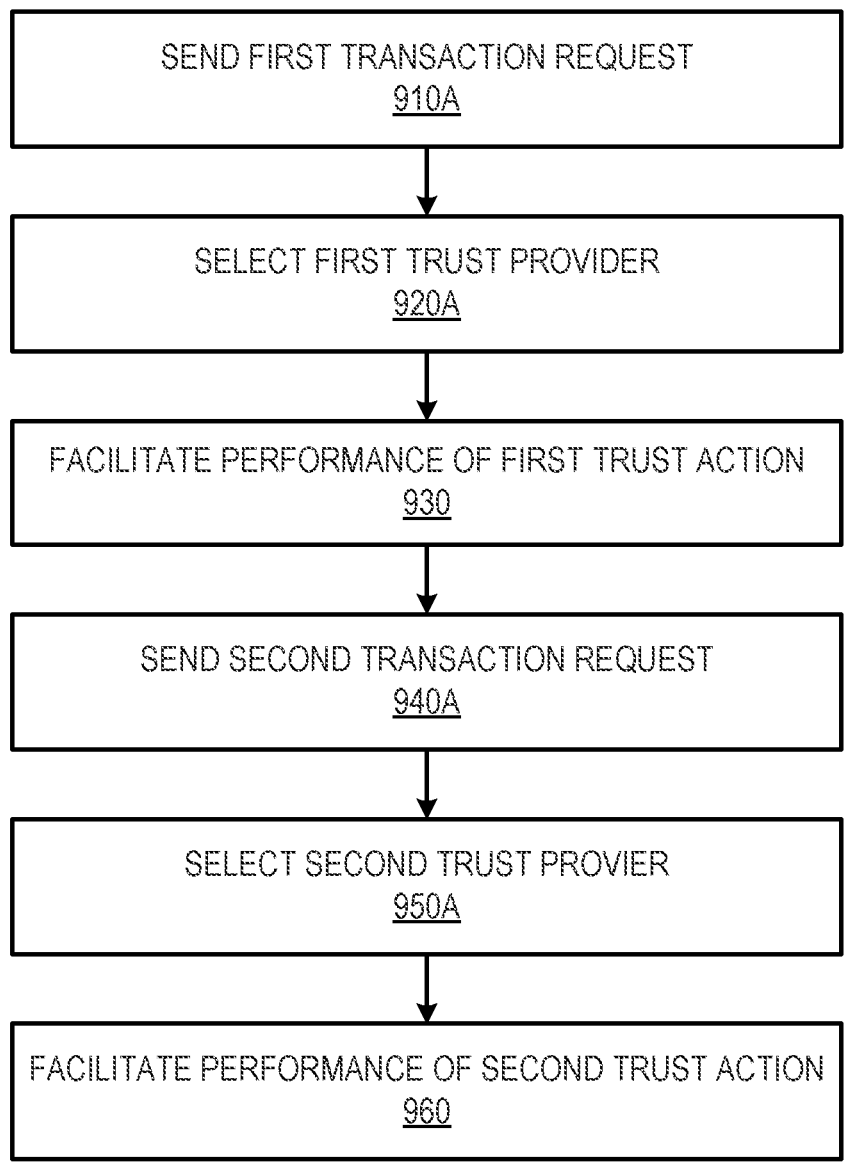
FIGS. 9A-9B are flowcharts illustrating methods involving document-based transactions utilizing multiple trust service providers within a cloud-based service, according to some example embodiments.
Figure 9B:
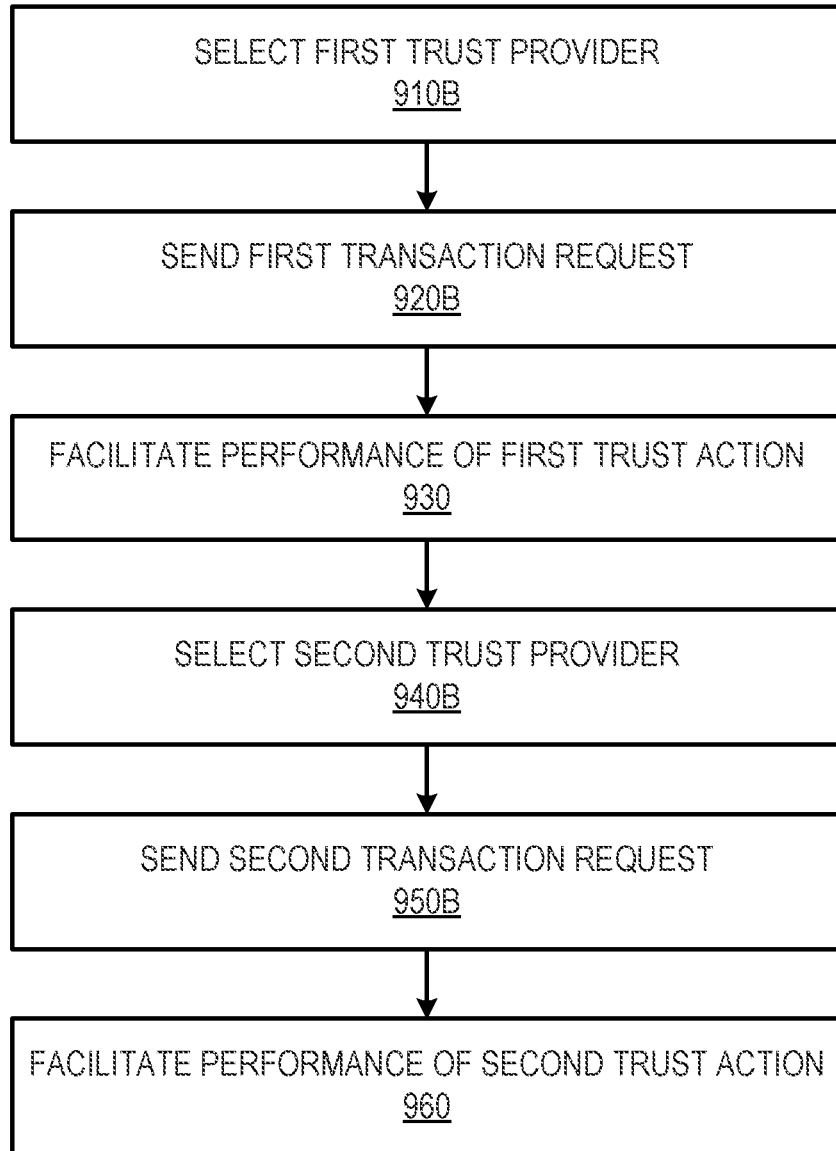

FIGS. 9A-9B are flowcharts illustrating a methods 900A, 900B, which each handle a document-based transaction involving multiple trust service providers within a cloud-based service, according to some example embodiments. In these examples, the system performing the methods is a combination of the systems discussed in FIGS. 6-8. Essentially, the system includes DTM platform 640, one or more client devices, and TSPs 650, 750 and 850, with different connectors (655, 755A, or 855) responsible for facilitating the trust actions as described above. For the purposed of discussing methods 900A and 900B, the client device could be any of client device 610, 710, 810, or a combination of them. Accordingly, the discussion will reference client device 610 as a proxy for the client devices discussed in FIGS. 6-8.

In FIG. 9A, the method 900A includes operations such as sending a first transaction request at 910A, selecting a first trust provider at 920A, facilitating performance of a first trust action at 930, sending a second transaction request at 940A, selecting a second trust provider at 950A, and facilitating performance of the second trust action at 960. As discussed below, FIG. 9B illustrates method 900B, which is similar to method 900A with some re-ordering of operations.

The method 900A begins at 910A with the DTM platform 640 sending a first transaction request to client device 610, which could be received by a DTM interface or a connector module. The method 900A continues at 920A with selection of a first trust provider, such as TSP 650, 750, or 850. In an example, the TSP selection is performed on the DTM platform 640 in response to a user accepting the first transaction request. In another example, the TSP selection can be performed on the client device 610, such as by the DTM interface 620, based on policy rules or parameters provided by the DTM platform 640. TSP selection can involve a preferred TSP and a backup TSP. Accordingly, the DTM platform 640 can include instructions identifying the preferred TSP and the backup TSP, which then allows the client device to select the TSP based on these instructions. For example, if the client device is not configured to connect with the preferred TSP, but does allow for connection to the backup TSP, the backup TSP will be selected.

At 930, the method 900A continues with the connector, such as connector module 655, 755A, or 855, facilitating performance of the first trust action. Operations 940A-960 are illustrated as being serial to operations 910A-930, however, these operations can occur concurrently or asynchronously. Additionally, the operations involving the second transaction request can operate on the same document or even involve performing a second trust action (e.g., electronic signature) on the results of the first transaction. In other words, operations 940A-960 can involve a second user/recipient electronically signing a document previously executed by a first user/recipient. Alternatively, operations 940A-960 can involve a completely separate transaction where the first user/recipient uses a second (different) TSP to perform a trust action.

The method 900A continues at 940A with the DTM platform 640 sending a second transaction request to the same or a second client device. At 940A, the method 900A continues at 950A with the DTM platform 640 selecting a second trust provider. In this example, the second trust provider is different than the first trust provider, with selection based on application of policy rules against transaction parameters or user/recipient identity, among other things. At 960, the method 900A can conclude with the connector, such as connector 855, facilitating performance of the second trust action with TSP 850.

The method 900B includes operations such as selecting a first trust provider at 910B, sending a first transaction request at 920B, facilitating performance of a first trust action at 930, selecting a second trust provider at 940B, sending a second transaction request at 950B and facilitating performance of a second trust action at 960. The method 900B can begin at 910B with the DTM platform 640 selecting a first trust provider, such as TSP 650. Selection of the first trust provider can involve evaluation of policy rules governing selection of TSPs. At 920B, the method 900B continues with the DTM platform 640 sending a first transaction request to a connector operating within a client device or TSP depending upon the configuration of the selected TSP. At 930, the method 900B continues with the connector facilitating performance of a first trust action by the selected TSP. At 940B, the method 900B continues with the DTM platform 640 selecting a second trust provider, such as TSP 850. The method 900B continues at 950B with the DTM platform 640 sending a second transaction request to a connector operating within a client device or TSP, such as webapp connector 655 operating on TSP 650. At 960, the method 900B concludes with the connector, webapp connector 655, facilitating performance of the trust action.

Figure 10:
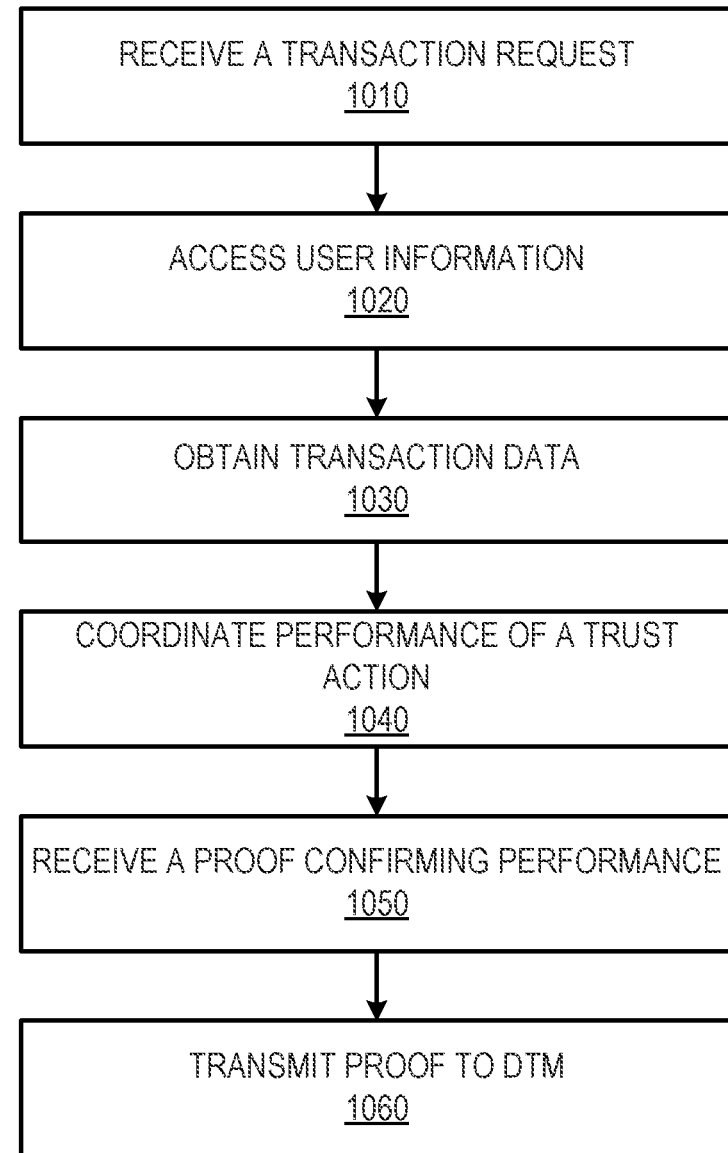
FIG. 10 is a flowchart illustrating operation of a connector facilitating a trust action within a document-based transaction on a cloud-based service, according to some example embodiments.

FIG. 10 is a flowchart illustrating a method of operation of a connector, such as connector module 655, 755A, or 855, facilitating a trust action within a document-based transaction on a cloud-based service, according to some example embodiments. In this example, the method 1000 includes operations such as, receiving a transaction request at 1010, accessing user information at 1020, obtaining transaction data at 1030, coordinating performance of a trust action at 1040, receiving a proof confirming performance at 1050, and transmitting the proof to a DTM at 1060.

The method 1000 begins at 1010 with the connector, such as connector module 655, 755A, or 855, receiving a transaction request from the DTM platform 640. The transaction request can include a short-lived token or similar mechanism to enable easy reference back to the DTM platform to receive information about the transaction. The transaction request can also include a requested trust action to be performed by a particular TSP, such as TSP 650, 750, or 850. At 1020, the method 1000 continues with the connector requesting access to user information from the DTM platform using the short-lived token. Alternatively, the connector requests user/recipient information from the client device.

At 1030, the method 1000 continues with the connector obtaining transaction data from the DTM platform, including a selected TSP to perform the requested trust action. At 1040, the method 1000 continues with the connector coordinating performance of the requested trust action by the TSP. At 1050, the method 1000 continues with the connector receiving a proof confirming performance of the trust action by the TSP. As discussed above, the proof returned by the TSP allows for verification of performance of the trust action. In some examples, receiving the proof triggers verification of the proof by the connector, to ensure the proof meet certain pre-defined criteria. Finally, at 1060, the method 1000 concludes with the connector transmitting the proof to the DTM platform.

Modules, Components, and Logic

Certain embodiments are described herein as including logic or a number of components, modules, or mechanisms. Modules may constitute either software modules (e.g., code embodied on a machine-readable medium, such a random access memory used by a hardware processor) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-10 are implemented in some embodiments in the context of a machine and an associated software architecture or across multiple machines with architectures along the lines discussed herein. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 11:
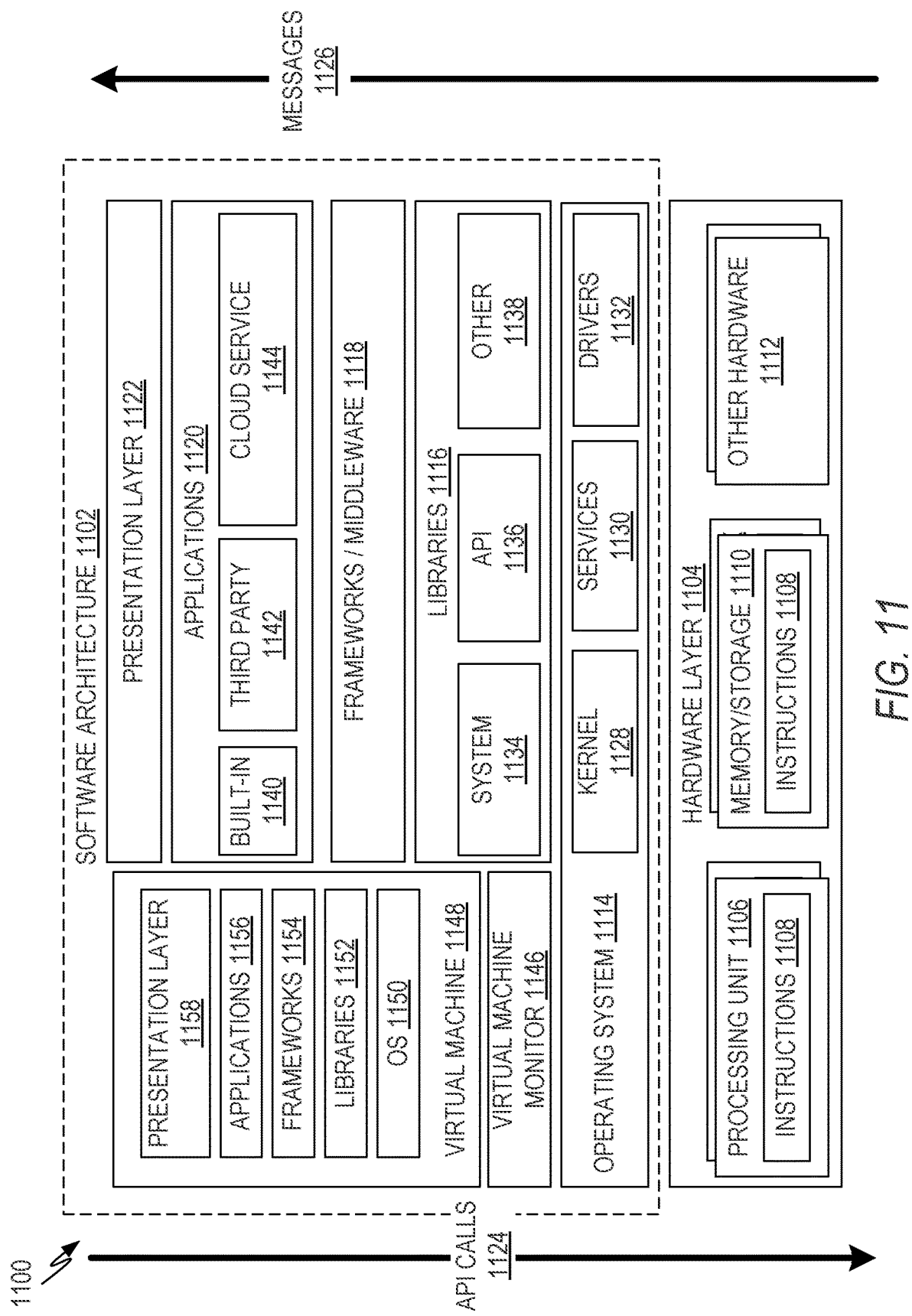
FIG. 11 is a block diagram illustrating an example of a software architecture that may be installed on a machine, according to some example embodiments.

FIG. 11 is a block diagram 1100 illustrating a representative software architecture 1102, which may be used in conjunction with various hardware architectures herein described. FIG. 11 is merely a non-limiting example of a software architecture and it will be appreciated that many other architectures may be implemented to facilitate the functionality described herein. The software architecture 1102 may be executing on hardware such as machine 1200 of FIG. 12 that includes, among other things, processors 1210, memory 1230, and I/O components 1250. A representative hardware layer 1104 is illustrated and can represent, for example, the machine 1200 of FIG. 12. The representative hardware layer 1104 comprises one or more processing units 1106 having associated executable instructions 1108. Executable instructions 1108 represent the executable instructions of the software architecture 1102, including implementation of the methods, modules and so forth of FIGS. 2-11. Hardware layer 1104 also includes memory and/or storage modules 1110, which also have executable instructions 1108. Hardware layer 1104 may also comprise other hardware as indicated by 1112 which represents any other hardware of the hardware layer 1104, such as the other hardware illustrated as part of machine 1200.

In the example architecture of FIG. 11, the software 1102 may be conceptualized as a stack of layers where each layer provides particular functionality. For example, the software 1102 may include layers such as an operating system 1114, libraries 1116, frameworks/middleware 1118, applications 1120 and presentation layer 1122. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system 1134 libraries (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 includes built-in applications 1140 and/or third party applications 1142. Examples of representative built-in applications 1140 may include, but are not limited to, a contacts application, a browser application, a book reader application, a location application, a media application, a messaging application, and/or a game application. Third party applications 1142 may include any of the built in applications as well as a broad assortment of other applications. In a specific example, the third party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1142 may invoke the API calls 1124 provided by the mobile operating system such as operating system 1114 to facilitate functionality described herein. In this example, applications 1122 include a cloud service application 1144 that can be configured to communicate directly with one or more service appliances, as well as a cloud-based service platform.

The applications 1120 may utilize built in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware machine (such as the machine of FIG. 12, for example). A virtual machine is hosted by a host operating system (operating system 1114 in FIG. 12) and typically, although not always, has a virtual machine monitor 1146, which manages the operation of the virtual machine as well as the interface with the host operating system (i.e., operating system 1114). A software architecture executes within the virtual machine such as an operating system 1150, libraries 1152, frameworks/middleware 1154, applications 1156 and/or presentation layer 1158. These layers of software architecture executing within the virtual machine 1148 can be the same as corresponding layers previously described or may be different.

Example Machine Architecture and Machine-Readable Medium

Figure 12:
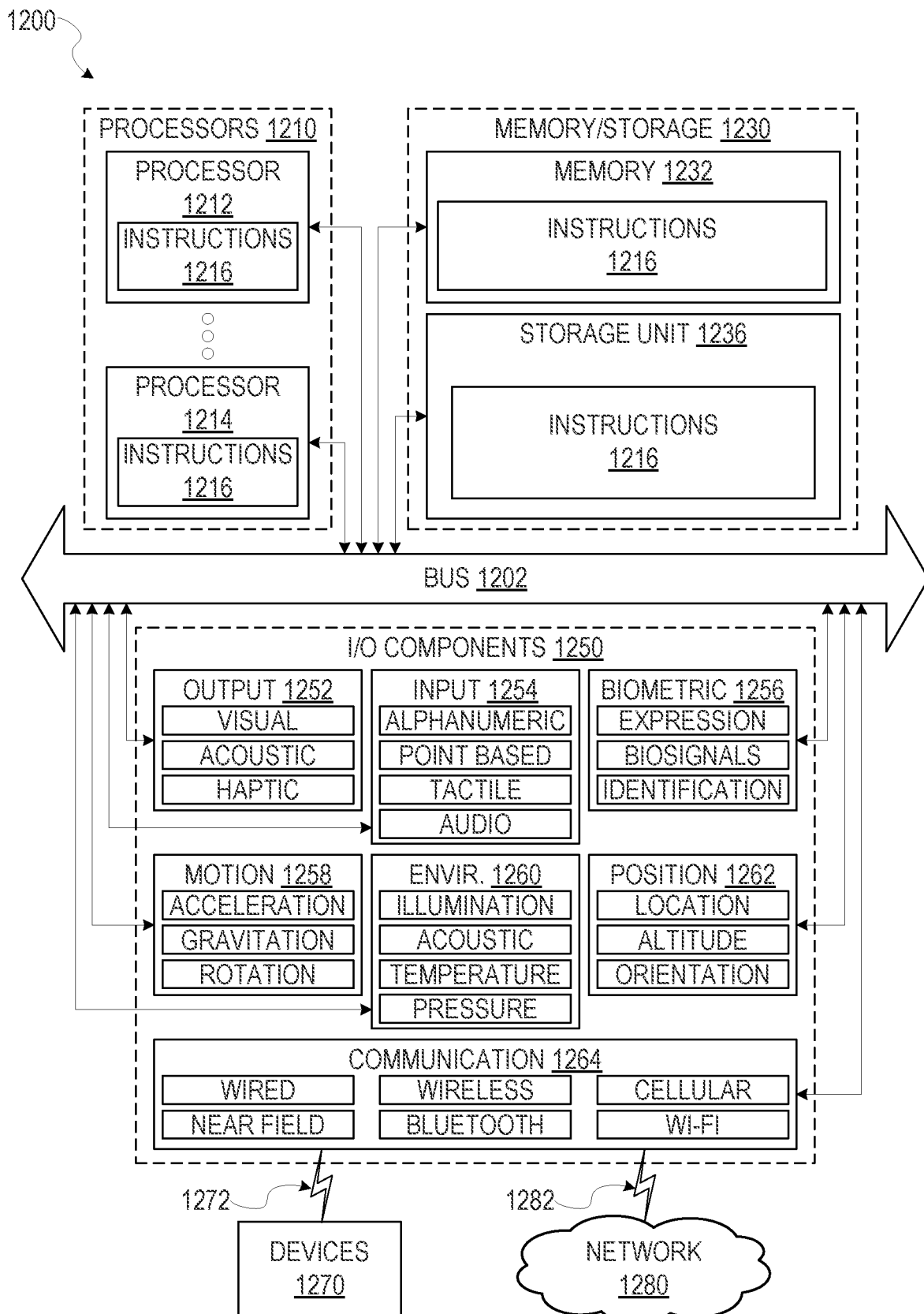
FIG. 12 illustrates a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example the instructions may cause the machine to execute the flow diagrams of FIGS. 4-6 and 8-11. Additionally, or alternatively, the instructions may implement coordination service modules such as service module, coordination module, communication module, appliance selection module, and policy module as well as service appliance modules such as service module, coordination module, communication module, data management module and policy module of FIGS. 2 and 3, and so forth. The instructions transform the general, non-programmed machine into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1212 and processor 1214 that may execute instructions 1216. The term "processor" is intended to include multi-core processor that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core process), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of processors 1210 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262 among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via coupling 1282 and coupling 1272 respectively. For example, the communication components 1264 may include a network interface component or other suitable device to interface with the network 1280. In further examples, communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a Universal Serial Bus (USB)).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or other type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to devices 1270. The term "transmission medium" shall be taken to include any intangible medium that is capable of storing, encoding, or carrying instructions 1216 for execution by the machine 1200, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The claimed invention includes:

1. A method comprising:
receiving, by a client device, from a server, a request including a requested trust action to be performed with respect to an electronic document, wherein the requested trust action comprises obtaining electronic signatures on the electronic document from a plurality of users;
transmitting, by the client device, to a trust service provider, a performance request including a token for performance of the requested trust action on the electronic document;
obtaining, by the client device, a proof confirming performance of the requested trust action, wherein the proof includes evidence to verify presentation of data representative of the electronic document to each of the plurality of users and performance of an event on the electronic document by each of the plurality of users, wherein performance of the event on the electronic document comprises one or more of electronically signing or electronically initialing the electronic document, wherein obtaining the proof comprises receiving a digitally signed version of the electronic document from the trust service provider, and wherein the performance of the requested trust action is with respect to a rasterized image of at least a portion of the digitally signed version of the electronic document;
validating, by the client device, based on one or more pre-defined signature related criteria, for each of the plurality of users, the proof to determine that the proof meets one or more minimum requirements as the evidence; and
transmitting, by the client device, the proof to the server, wherein the server and the trust service provider do not communicate directly.

2. The method of claim 1, wherein obtaining the proof includes: receiving a cryptographically transformed digital hash that provides the evidence of a particular event or processing of the electronic document.

3. The method of claim 1, wherein the token is a short-lived token issued by a digital transaction management platform used to identify a transaction request.

4. The method of claim 1, further comprising:
determining, by the client device, a type of the requested trust action; and
selecting, by the client device, from a plurality of candidate trust service providers, the trust service provider based on the type of the requested trust action.

5. The method of claim 4, wherein selecting the trust service provider is performed using a policy chosen based on the type of the requested trust action.

6. A non-transitory computer-readable medium comprising memory with instructions encoded thereon, the instructions, when executed by one or more processors of a client device, cause the one or more processors to:
receive, from a server, a request including a requested trust action to be performed with respect to an electronic document, wherein the requested trust action comprises obtaining electronic signatures on the electronic document from a plurality of users;

transmit, to a trust service provider, a performance request including a token for performance of the requested trust action on the electronic document;

obtain a proof confirming performance of the requested trust action, wherein the proof includes evidence to verify presentation of data representative of the electronic document to each of the plurality of users and performance of an event on the electronic document by each of the plurality of users, wherein performance of the event on the electronic document comprises one or more of electronically signing or electronically initialing the electronic document, wherein to obtain the proof the instructions cause the one or more processors to receive a digitally signed version of the electronic document from the trust service provider, and wherein the performance of the requested trust action is with respect to a rasterized image of at least a portion of the digitally signed version of the electronic document;

validate, based on one or more pre-defined signature related criteria, for each of the plurality of users, the proof to determine that the proof meets one or more minimum requirements as the evidence; and transmit the proof to the server, wherein the server and the trust service provider communicate by passing communications through the client device.

7. The non-transitory computer-readable medium of claim 6, wherein to obtain the proof the instructions cause the one or more processors to receive a cryptographically transformed digital hash that provides the evidence of a particular event or processing of the electronic document.

8. The non-transitory computer-readable medium of claim 6, wherein the token is a short-lived token issued by a digital transaction management platform used to identify a transaction request.

9. The non-transitory computer-readable medium of claim 6, the instructions further comprising instructions to:
determine a type of the requested trust action; and
select, from a plurality of candidate trust service providers, the trust service provider based on the type of the requested trust action.

10. The non-transitory computer-readable medium of claim 9, wherein selecting the trust service provider is performed using a policy chosen based on the type of the requested trust action.

11. A system comprising:
memory with instructions encoded thereon; and
one or more processors that, when executing the instructions, are caused to:
receive, by a client device, from a server, a request including a requested trust action to be performed with respect to an electronic document, wherein the requested trust action comprises obtaining electronic signatures on the electronic document from a plurality of users;

transmit, by the client device, to a trust service provider, a performance request including a token for performance of the requested trust action on the electronic document;

obtain, by the client device, a proof confirming performance of the requested trust action, wherein the proof includes evidence to verify presentation of data representative of the electronic document to each of the plurality of users and performance of an event on the electronic document by each of the plurality of users, wherein performance of the event on the electronic document comprises one or more of electronically signing or electronically initialing the electronic document, wherein to obtain the proof the one or more processors are caused to receive a digitally signed version of the electronic document from the trust service provider, and wherein the performance of the requested trust action is with respect to a rasterized image of at least a portion of the digitally signed version of the electronic document;

validate, by the client device, based on one or more pre-defined signature related criteria, for each of the plurality of users, the proof to determine that the proof meets one or more minimum requirements as the evidence; and transmit, by the client device, the proof to the server, wherein the server and the trust service provider communicate by passing communications through the client device.

12. The system of claim 11, wherein to obtain the proof the one or more processors are caused to receive a cryptographically transformed digital hash that provides the evidence of a particular event or processing of the electronic document.

13. The system of claim 11, wherein the token is a short-lived token issued by a digital transaction management platform used to identify a transaction request.

14. The system of claim 11, wherein the one or more processors, when executing the instructions, are caused to:
determine a type of the requested trust action; and
select, from a plurality of candidate trust service providers, the trust service provider based on the type of the requested trust action.

* * * * *